(12) United States Patent
Kim et al.

(10) Patent No.: US 9,451,262 B2
(45) Date of Patent: Sep. 20, 2016

(54) METHOD AND APPARATUS FOR INTRA-PREDICTION ENCODING/DECODING

(75) Inventors: Sunyeon Kim, Seoul (KR); Yunglyul Lee, Seoul (KR); Joohee Moon, Seoul (KR); Haekwang Kim, Seoul (KR); Byeungwoo Jeon, Gyeonggi-do (KR); Daeyeon Kim, Seoul (KR); Jeongyeon Lim, Gyeonggi-do (KR)

(73) Assignee: SK TELECOM CO., LTD., Seoul (KR)

( * ) Notice: Subject to any disclaimer, the term of this patent is extended or adjusted under 35 U.S.C. 154(b) by 898 days.

(21) Appl. No.: 13/391,583

(22) PCT Filed: Aug. 21, 2010

(86) PCT No.: PCT/KR2010/005567
§ 371 (c)(1),
(2), (4) Date: Apr. 28, 2012

(87) PCT Pub. No.: WO2011/021910
PCT Pub. Date: Feb. 24, 2011

(65) Prior Publication Data
US 2012/0201295 A1 Aug. 9, 2012

(30) Foreign Application Priority Data
Aug. 21, 2009 (KR) .................... 10-2009-0077449

(51) Int. Cl.
H04N 7/32 (2006.01)
H04N 19/11 (2014.01)
H04N 19/70 (2014.01)
H04N 19/61 (2014.01)

(52) U.S. Cl.
CPC ............. *H04N 19/11* (2014.11); *H04N 19/61* (2014.11); *H04N 19/70* (2014.11)

(58) Field of Classification Search
CPC ................ H04N 19/00884; H04N 19/00042; H04N 19/00781
USPC ........................................ 375/240.03, 240.12
See application file for complete search history.

(56) References Cited

U.S. PATENT DOCUMENTS 5,633,686 A * 5/1997 Boden .................. H04N 5/4401
348/441
6,295,379 B1 * 9/2001 Goldstein ............... G06T 9/005
382/238

(Continued)

FOREIGN PATENT DOCUMENTS

KR 10-2003-0064332 7/2003
KR 1020060083158 A 7/2006

(Continued)

OTHER PUBLICATIONS

International Search Report mailed Apr. 14, 2011 for PCT/KR2010/005567, citing the above references.

*Primary Examiner* — Jamie Atala
*Assistant Examiner* — Nguyen Truong
(74) *Attorney, Agent, or Firm* — Hauptman Ham, LLP

(57) ABSTRACT

The present disclosure provides a method and apparatus for intra prediction encoding/decoding. The method includes: selecting an intra prediction mode of each block to be encoded; encoding a residual block generated through an intra prediction of the block according to the selected intra prediction mode to generate a coefficient bit; encoding a mode identifier for indicating the intra prediction mode according to the predetermined mode determination method to generate a mode bit; generating a bitstream including a mode bit field including a mode bit for one or more blocks and a coefficient bit field including a coefficient bit for the block; and including a mode bit field pointer for identifying the mode bit field in the bitstream. The present disclosure simplifies the process of selecting a prediction mode in a video compression to improve a compression speed and decreases a size of compressed data to improve the compression efficiency.

20 Claims, 15 Drawing Sheets

(56) References Cited

U.S. PATENT DOCUMENTS

| | | | |
|---|---|---|---|
| 8,406,286 B2* | 3/2013 | Liu et al. | 375/240 |
| 2006/0193527 A1* | 8/2006 | Kalva et al. | 382/239 |
| 2007/0297510 A1* | 12/2007 | Herpel | H04N 19/51 375/240.15 |
| 2008/0170615 A1* | 7/2008 | Sekiguchi et al. | 375/240.14 |
| 2008/0310745 A1* | 12/2008 | Ye et al. | 382/238 |
| 2009/0175334 A1* | 7/2009 | Ye et al. | 375/240.12 |

FOREIGN PATENT DOCUMENTS

| | | |
|---|---|---|
| KR | 10-2007-0042900 | 4/2007 |
| KR | 10-2008-0002953 | 1/2008 |

\* cited by examiner

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

FIG. 7A

| N | N | N | N | N | N | N | N | N |
|---|---|---|---|---|---|---|---|---|
| N | a | b | c | d | | | | |
| N | e | f | g | h | | | | |
| N | i | j | k | l | | | | |
| N | m | n | o | p | | | | |

METHOD AND APPARATUS FOR INTRA-PREDICTION ENCODING/DECODING

CROSS REFERENCE TO RELATED APPLICATION

This application claims the priority of Korean Patent Application No. 10-2009-0077449, filed on Aug. 21, 2009 in the KIPO (Korean Intellectual Property Office). Further, this application is the National Phase application of International Application No. PCT/KR2010/005567 filed Aug. 23, 2010, which designates the United States and was published in Korean.

TECHNICAL FIELD

The present disclosure relates to a method and an apparatus for intra-prediction encoding/decoding. More particularly, the present disclosure relates to a method and apparatus, which simplifies the process of selecting a prediction mode in compressing a video to improve a compression speed and decreases a size of compressed data to improve the compression efficiency.

BACKGROUND ART

The statements in this section merely provide background information is related to the present disclosure and may not constitute the prior art.

MPEG (Moving Picture Experts Group) and VCEG (Video Coding Experts Group) developed an improved and excellent video compression technology over the MPEG-4 Part 2 and H.263 standards. The new standard is called H.264/AVC (Advanced Video Coding) and was released simultaneously as MPEG-4 Part 10 AVC and ITU-T Recommendation H.264.

In the image compression techniques such as H.264/AVC, various prediction techniques are employed including an inter prediction and an intra prediction to obtain effective image compressions. Here, the intra prediction includes an intra_4×4 prediction, intra_16×16 prediction, intra_8×8 prediction and other various predictions, where the respective intra predictions include a plurality of prediction modes.

The image compression techniques such as H.264/AVC compresses each block in a plurality of prediction modes from which an optimal prediction mode is selected to perform a prediction. Therefore, the compression efficiency depends on a particular prediction mode selection as the optimal prediction mode to perform the prediction, and the optimal prediction mode selection requires block predictions in the entire prediction modes and followed by calculations of the encoding cost using a predetermined cost function to select the prediction mode with the lowest encoding cost.

Therefore, in order to determine the optimal prediction mode whether it is intra_4×4 prediction or intra_6×16 prediction, the cost should be calculated after trying every one of the prediction modes through the predictions. This makes an encoding process complex and lowers the encoding efficiency or compression efficiency.

Additionally, to correctly decode the image, information on the selected optimal prediction mode should be also encoded. In response to recent incremental requirements for higher resolution videos, the number of blocks to be encoded has been increased resulting in a greater quantity of bits required to encode the information on the optimal prediction mode with respect to each block, which degrades the compression efficiency.

DISCLOSURE

Technical Problem

Therefore, the present disclosure has been made in view of the above mentioned problems to simplify the process of selecting a prediction mode in compressing a video resulting in improvement of a compression speed and to decrease a size of compressed data resulting in improvement of the compression efficiency.

Technical Solution

An aspect of the present disclosure provides an apparatus for encoding a video, including: a prediction mode selector for selecting an intra prediction mode of each block to be encoded in an input video as a predetermined intra prediction mode or an intra prediction mode according to a predetermined mode determination method; an intra prediction encoder for encoding a residual block generated through an intra prediction of the block according to the selected intra prediction mode to generate a coefficient bit; and a bitstream generator for encoding a mode identifier for indicating the intra prediction mode according to the predetermined mode determination method to generate a mode bit and generating a bitstream including a mode bit field including a mode bit for one or more blocks and a coefficient bit field including a coefficient bit for the block with a mode bit field pointer for identifying the mode bit field included in the bitstream.

Another aspect of the present disclosure provides a method of encoding a video, including: selecting an intra prediction mode of each block to be encoded in an input video as a predetermined intra prediction mode or an intra prediction mode according to a predetermined mode determination method; encoding a residual block generated through an intra prediction of the block according to the selected intra prediction mode to generate a coefficient bit; encoding a mode identifier for indicating the intra prediction mode according to the predetermined mode determination method to generate a mode bit; generating a bitstream including a mode bit field including a mode bit for one or more blocks and a coefficient bit field including a coefficient bit for the block; and including a mode bit field pointer for identifying the mode bit field in the bitstream.

Another aspect of the present disclosure provides an apparatus for decoding a video, including: a bitstream extractor for extracting a mode bit field pointer from a bitstream, extracting a mode bit field and a coefficient bit field from the bitstream by using the extracted mode bit field pointer, and decoding a mode bit of the mode bit field to reconstruct one or more mode identifiers; a prediction mode selector for selecting a predetermined intra prediction mode or an intra prediction mode indicated by the reconstructed one or more mode identifiers as an intra prediction mode of each block to be encoded; and an intra prediction decoder for decoding a coefficient bit of the coefficient bit field to reconstruct a residual block of the block, and reconstructing the block by using a predicted block generated by the prediction of the block according to the selected intra prediction mode of the block and the reconstructed residual block.

An aspect of the present disclosure provides a method of decoding a video, including: extracting a mode bit field pointer from a bitstream; extracting a mode bit field and a coefficient bit field from the bitstream by using the extracted mode bit field pointer; decoding a mode bit of the mode bit field to reconstruct one or more mode identifiers; decoding a coefficient bit of the coefficient bit field to reconstruct a residual block of each block to be decoded; selecting a predetermined intra prediction mode or an intra prediction mode indicated by the reconstructed one or more mode identifiers as an intra prediction mode of the block to be decoded; and reconstructing the block by using a predicted block generated through the prediction of the block according to the selected intra prediction mode of the block and the reconstructed residual block.

Advantageous Effects

According to the present disclosure as described above, the present disclosure can simplify the process of selecting a prediction mode in compressing a video resulting in improvement of a compression speed and decreasing a size of a compressed data resulting in improvement of the compression efficiency.

DESCRIPTION OF DRAWINGS

FIGS. 7A and 8B are diagrams illustrating a variation of pixel values of adjacent pixels according to an embodiment of the present disclosure, FIG. 17 is a diagram illustrating a case in which pixel values of adjacent pixels of a block are the same.

MODE FOR INVENTION

Figure 1:
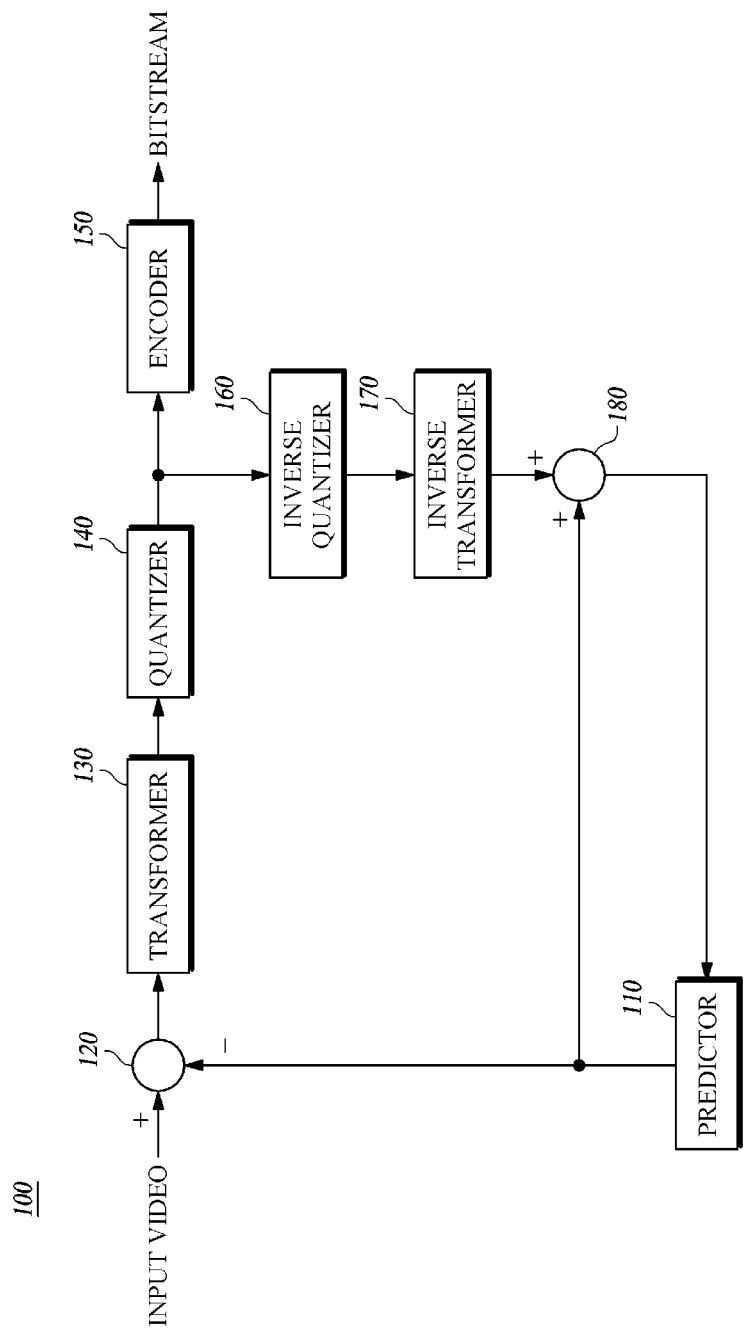
FIG. 1 is a block diagram schematically illustrating a video encoding apparatus.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus or video decoding apparatus described hereinafter may be a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication device such as a modem for carrying out communication between various devices or wired/wireless communication networks, a memory for storing various programs for encoding videos and related data, and a microprocessor for executing the programs to effect operations and controls.

In addition, the video encoded into a bitstream by the video encoding apparatus may be transmitted in real time or non-real-time to the video decoding apparatus for decoding the same where it is reconstructed and reproduced into the video after being transmitted via a wired/wireless communication network including the Internet, a short range wireless communication network, a wireless LAN network, a WiBro (Wireless Broadband) also known as WiMax network, and a mobile communication network or a communication interface such as cable or USB (universal serial bus).

In addition, although the video encoding apparatus and the video decoding apparatus may be equipped with the functions of performing the inter prediction as well as the intra prediction, which lacks a direct correlation with the aspects of the present disclosure, a detailed description will be omitted to avoid any confusions.

A video typically includes a series of pictures, each of which is divided into predetermined areas, such as blocks. When each picture is divided into blocks, each of the blocks is classified into an intra block or an inter block depending on the method of classification. The intra block means the block that is encoded through an intra prediction coding which is within a current picture where the current encoding is performed for generating a predicted block by predicting a current block using pixels of a reconstructed block that underwent previous encoding and decoding and then encoding the differential value of the predicted block from the pixels of the current block. The inter block means the block that is encoded through an inter prediction coding which generates the predicted block by predicting the current block in the current picture through referencing one or more past pictures or future pictures to predict the current block in the current picture and then encoding the differential value of the predicted block from the current block. Here, the picture that is referenced in encoding or decoding the current picture is called a reference picture.

FIG. 1 is a block diagram schematically illustrating a video encoding apparatus.

A video encoding apparatus 100 includes a predictor 110, a subtracter 120, a transformer 130, a quantizer 140, an encoder 150, an inverse quantizer 160, an inverse transformer 170, and an adder 180.

The predictor 110 intra predicts a current block to generate a predicted block. That is, when a block, i.e. the current block, to be currently encoded in an input picture is input, the predictor 110 predicts original pixel values of pixels of the current block in accordance with a prediction direction of an intra prediction mode selected from a plurality of intra prediction modes and generates a predicted block having predicted pixel values to output the predicted block.

Here, the plurality of intra prediction modes may be a plurality of intra prediction modes according to a block mode of the current block or a plurality of intra prediction modes set by a user in advance. For example, when it is assumed that a video is compressed under the H.264/AVC standard and a block mode of the current block is the intra 16×16 mode, the plurality of intra prediction modes may be four intra prediction modes which correspond to the prediction mode of the intra 16×16 mode defined under the H.264/AVC standard. Further, in the same case, when a user sets a horizontal mode and a vertical mode in four intra prediction modes in advance, the plurality of intra prediction modes may be the horizontal mode and the vertical mode in the intra 16×16 mode.

The subtracter 120 subtracts the predicted block from the current block to generate a residual block of the current block. Here, the output residual block includes a residual signal, and the residual signal has a value obtained by subtracting predicted pixel values of the predicted block from the original pixel values of the current block.

The transformer 130 transforms the residual block to generate a transformed block. That is, the transformer 130 transforms the residual signal of the residual block output from the subtracter 120 into the frequency domain to generate and output the transformed block having a transform coefficient. Here, the method used for transforming the residual signal into the frequency domain may be the discrete cosine transform (DCT) based transform or Hadamard transform among various other unlimited transforming techniques available from improving and modifying the DCT transform or the like, whereby the residual signal is transformed into the frequency domain and into the transform coefficient.

The quantizer 140 quantizes the transformed block to generate a transformed and quantized block. Specifically, the quantizer 140 quantizes the transform coefficients of the transformed block outputted from the transformer 130 to generate and output the transformed and quantized block having a quantized transform coefficient. Here, the quantizing method used may be the dead zone uniform threshold quantization (DZUTQ) or the quantization weighted matrix among their various improvement options.

The encoder 150 encodes the transformed and quantized block to output a bitstream. In particular, the encoder 150 encodes a frequency coefficient string resulted from scanning in the zigzag scanning or other various scanning methods with respect to the quantized transform coefficients of the transformed and quantized block outputted from the quantizer 140, by using various encoding techniques such as the entropy encoding, and generates and outputs the bitstream encompassing additional information needed to decode the involved block such as prediction mode information, quantization parameter, motion vector, etc.

The inverse quantizer 160 inversely quantizes the transformed and quantized block. Specifically, the inverse quantizer 160 inversely quantizes and outputs the quantized transform coefficients of the transformed and quantized block outputted from the quantizer 140.

The inverse transformer 170 inversely transforms the transformed and inversely quantized block. Specifically, the inverse transformer 170 inversely transforms the inversely quantized transform coefficients from the inverse quantizer 160 to reconstruct the residual block having the reconstructed residual coefficients.

The adder 180 adds the inversely transformed and reconstructed residual block from the inverse transformer 170 and the predicted block from the predictor 110 to reconstruct the current block. The reconstructed current block may be transferred to the predictor 110 for use in predicting other blocks including the next block or the next picture.

Figure 2:
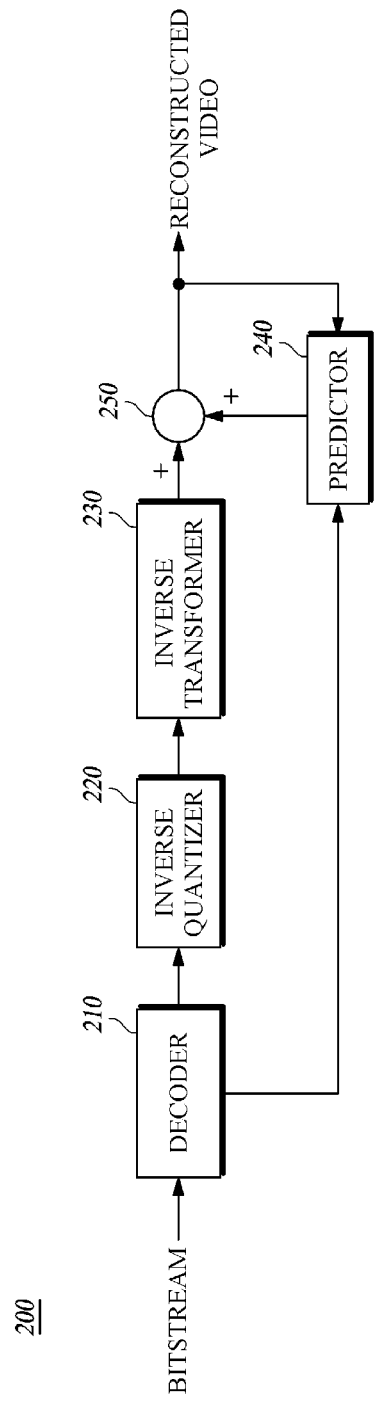
FIG. 2 is a block diagram schematically illustrating a video decoding apparatus.

FIG. 2 is a block diagram schematically illustrating a video decoding apparatus.

The video decoding apparatus 200 includes a decoder 210, an inverse quantizer 220, an inverse transformer 230, a predictor 240, and an adder 250.

The decoder 210 decodes a bitstream and extracts a transformed and quantized block. Specifically, the decoder 210 decodes and inversely scans a bit string extracted from the input bitstream to reconstruct the transformed and quantized block having a quantized transform coefficient. In this case, the decoder 210 decodes the bit string by using an encoding method, such as the entropy encoding, used in the encoder 150 of the video encoding apparatus 100.

The inverse quantizer 220 inversely quantizes the transformed and quantized block. Specifically, the inverse quantizer 220 inversely quantizes the quantized transform coefficients of the transformed and quantized block output from the decoder 210, wherein the inverse quantizer 220 in its operation performs a reversal of the quantization method used in the quantizer 140 of the video encoding apparatus 100.

The inverse transformer 230 inversely transforms the transformed and inversely quantized block output from the inverse quantizer 220 to reconstruct the residual block. Specifically, the inverse transformer 230 inversely transforms the inversely quantized transform coefficient of the transformed and inversely quantized block output from the inverse quantizer 220 to reconstruct the residual block having the reconstructed residual signal, wherein the inverse transformer 230 in its operation performs a reversal of the transform technique used in the transformer 130 of the video encoding apparatus 100.

The predictor 240 generates a predicted block by predicting the current block according to a prediction direction of an intra prediction mode extracted from the bitstream.

The adder 250 adds the reconstructed residual block and the predicted block to reconstruct the current block. Specifically, the adder 250 adds a reconstructed residual signal of the reconstructed residual block outputted from the inverse transformer 230 to the predicted pixel values of the predicted block outputted from the predictor 230 to calculate the reconstructed pixel values of the current block, thereby reconstructing the current block.

In the intra prediction of the video encoding apparatus and the video decoding apparatus described with reference to FIGS. 1 and 2, an optimal intra prediction mode is selected from the plurality of intra prediction modes illustrated in FIGS. 3 and 4 and a block is predicted according to a prediction direction of the selected optimal intra prediction mode.

Figure 3:
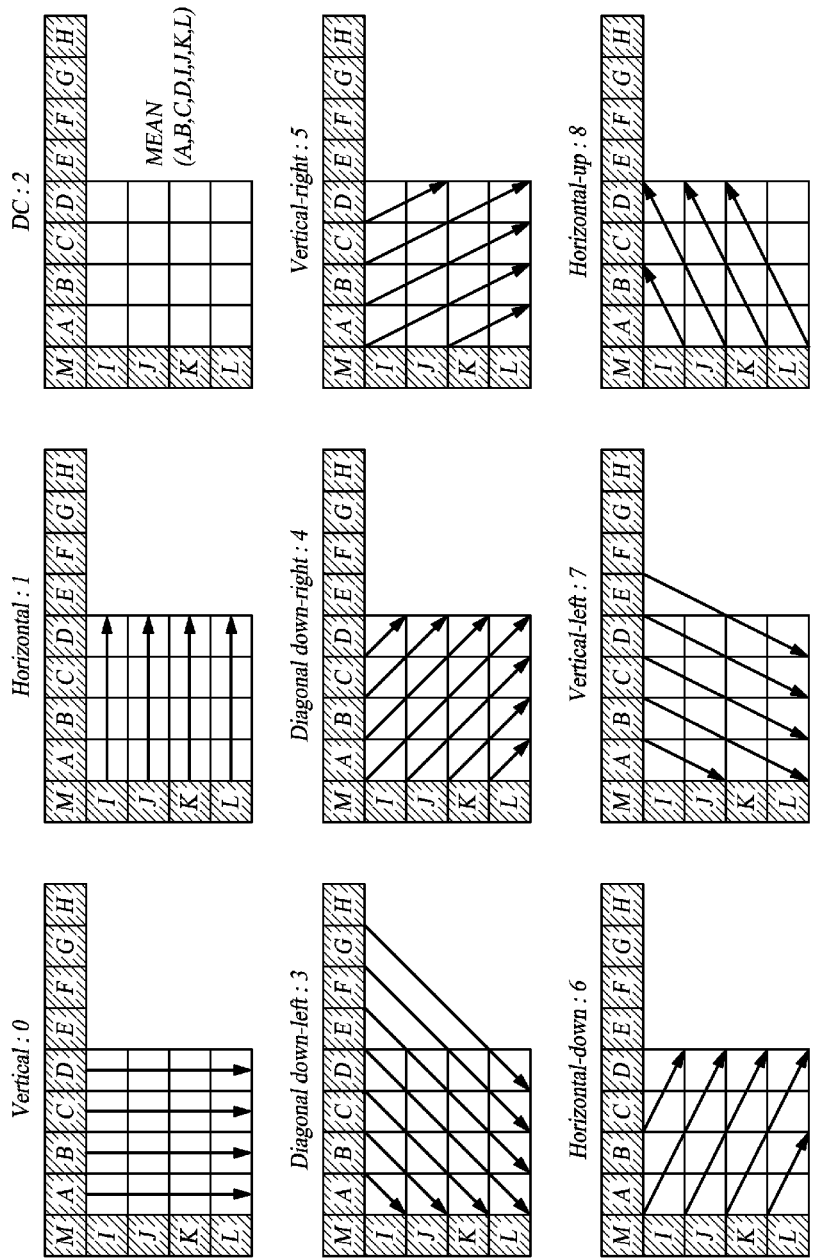
FIG. 3 is a diagram illustrating nine types of intra 4×4 prediction modes.

FIG. 3 is a diagram illustrating nine types of 4×4 prediction modes.

Referring to FIG. 3, the intra 4×4 prediction includes nine types of prediction modes including a vertical mode, a horizontal mode, a direct current (DC) mode, a diagonal down-left mode, a diagonal down-right mode, a vertical-right mode, a horizontal-down mode, a vertical-left mode, and a vertical-up mode, and mode numbers are assigned to the nine prediction modes, respectively. The intra 8×8 prediction includes nine types of prediction modes similar to those of the intra 4×4 prediction.

Figure 4:
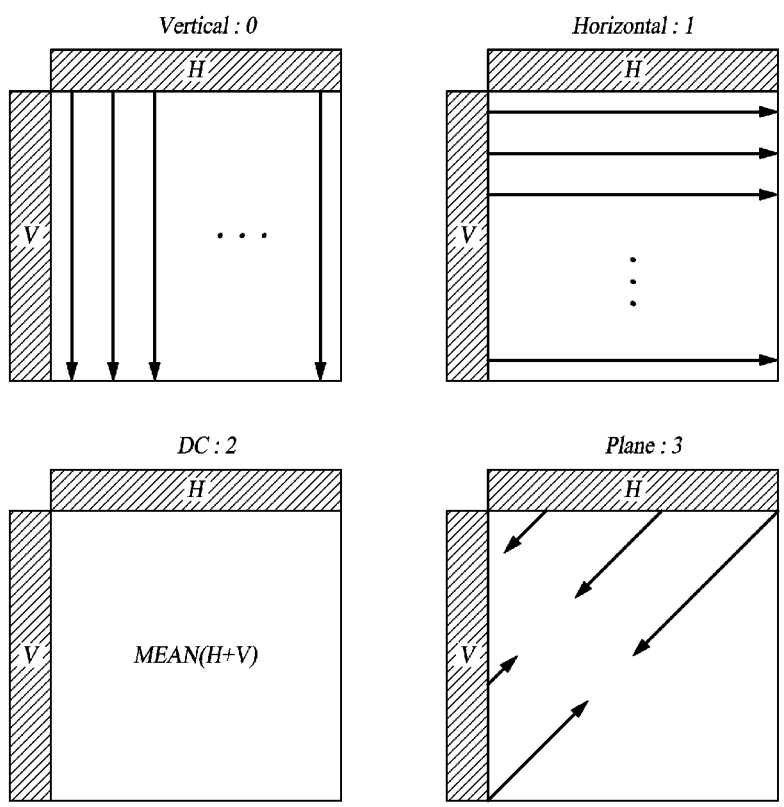
FIG. 4 is a diagram illustrating four types of intra 16×16 prediction modes.

FIG. 4 is a diagram illustrating nine types of intra 16×16 prediction modes.

Referring to FIG. 4, the intra 16×16 prediction includes four prediction modes including a vertical mode, a horizontal mode, a DC mode, and a plane mode, and mode numbers are assigned to the four prediction modes, respectively.

Figure 5:
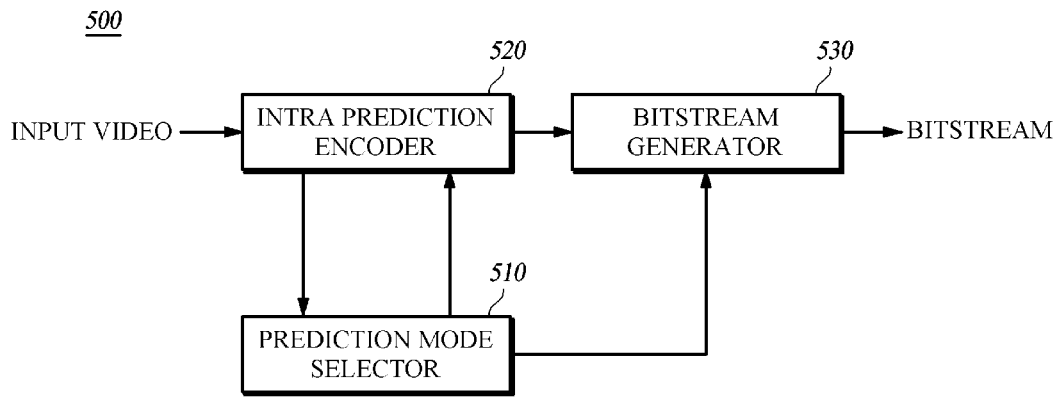
FIG. 5 is a block diagram schematically illustrating a video encoding apparatus according to an embodiment of the present disclosure.

FIG. 5 is a block diagram schematically illustrating the video encoding apparatus according to an embodiment of the present disclosure.

The video encoding apparatus 500 according to an embodiment of the present disclosure includes a prediction mode selector 510, an intra prediction encoder 520, and a bitstream generator 530.

The prediction mode selector 510 selects an intra prediction mode of each block to be encoded from the input video as a predetermined intra prediction mode or an intra prediction mode according to a predetermined mode determination method.

When a variation of pixel values of adjacent pixels of each block is smaller than a threshold Th, the prediction mode selector 510 may select the predetermined intra prediction mode as the intra prediction mode of each block. Here, the predetermined intra prediction mode may be an intra prediction mode (e.g. the DC mode in the case of the H.264/AVC) which predicts an average of the pixel values of the adjacent pixels of each block as a predicted pixel value of pixels of each block. The adjacent pixels of each block may be one of pixels included in surrounding blocks around each block and especially be pixels adjacent to each block among pixels included in the surrounding blocks. Further, the adjacent pixels of each block may be pixels which are encoded by the intra prediction encoder 520 and decoded to be previously reconstructed.

Further, when a variation of pixel values of adjacent pixels of each block is larger or equal to the threshold, the prediction mode selector 510 selects the intra prediction mode according to the predetermined mode determination method as the intra prediction mode of each block. To this end, the prediction mode selector 510 sequentially applies the respective intra prediction modes to a predetermined mode selection reference to select one intra prediction mode, wherein the DC mode among the plurality of intra prediction modes may be finally applied to the predetermined mode selection reference. Herein, the predetermined mode determination method is a method of selecting one intra prediction mode among the plurality of intra prediction modes according to the predetermined mode selection reference and selecting the selected intra prediction mode as the intra prediction mode of each block. The predetermined mode selection reference is a mode selection reference previously appointed between the video encoding apparatus and the video decoding apparatus, and for example may include a cost function, such as a rate-distortion optimization (RDO). Accordingly, by using the predetermined mode selection reference, the intra prediction mode having a least encoding cost, such as a rate-distortion cost (RD cost), may be selected as an optimal intra prediction mode.

Further, the prediction mode selector 510 may calculate the variation of the pixel values of the adjacent pixels of the block by using a degree of scattering. Herein, the degree of scattering may include dispersion, a standard deviation, a mean deviation, and a quartile deviation. Here, the threshold may be set depending on a quantification coefficient and a quantization stage size of each block.

The intra prediction encoder 520 encodes residual block generated through inter prediction of each block according to the intra prediction mode selected by the prediction mode selector to generate a coefficient bit. Specifically, the intra prediction encoder 520 encodes the residual block generated through intra prediction of each block according to the selected intra prediction mode of each block to generate the coefficient bit. The intra prediction encoder 520 may be configured in the same manner as the video encoding device 100 aforementioned with reference to FIG. 1. That is, the intra prediction encoder 520 predicts each block to be encoded according to the intra prediction mode selected by the prediction mode selector 510 to generate a predicted block, subtracts the generated predicted block from each block to generate a residual block, and transforms and quantizes a residual signal of the residual block to generate a quantized frequency coefficient, and performs a scan and entropy encoding, to generate the coefficient bit. In this case, the transform and/or quantization process may be optionally omitted depending on an implementation scheme.

Further, each block may be defined in the unit of macroblocks or in the unit of sub blocks. The macroblock has a size of 16×16 and the sub block has a size of 4×4, but the block is not limited thereto and may have various sizes. For example, the macroblock may be a block having a size of M×N, such as a size of 16×16, a size of 32×32, and a size of 8×8, wherein M and N are integers, and the sub block may be a block having a size of M×N, such as a size of 16×16, a size of 32×32, and a size of 8×8 if the sub block is smaller than the macroblock, wherein M and N are integers.

Further, the intra prediction encoder 520 inversely quantizes and inversely transforms the quantized frequency coefficients to reconstruct the residual block and adds the reconstructed residual block to the predicted block to reconstruct each block. Each reconstructed block may be stored in a storage device, such as a memory, and used for predicting a next block, a next slice, or a next picture. Especially, the stored reconstructed pixels are transferred to the prediction mode selector 510 to be used as adjacent pixels of each block.

The bitstream generator 530 encodes a mode identifier indicating the intra prediction mode selected according to the selection mode determination method to generate a mode bit and generates a mode bit field including a mode bit for one or more blocks and a bitstream including a coefficient bit field including a coefficient bit for each block, wherein a mode bit field pointer for identifying a mode bit field is inserted into the bitstream.

That is, the bitstream generator 530 collects the coefficient bit of each block in the unit of macroblocks, in the unit of slices, or in the unit of pictures to configure the coefficient bit field, encodes the mode identifier indicating the intra prediction mode of the block determined according to the predetermined mode determination method in the prediction mode selector 510, and collects the mode bit in the unit of macroblocks, in the unit of slices, or in the unit of pictures to configure a mode bit field. The configured mode bit field and the coefficient bit field may be included in macroblock data, slice data, or picture data.

In this case, the bit stream generator 530 configures the mode bit field not through encoding all mode identifiers indicating the determined intra prediction modes of each block by the prediction mode selector 510, but through encoding only the mode identifier indicating the intra prediction mode determined according to the predetermined mode determination method, not the predetermined intra prediction mode, because the variation of the pixel values of the adjacent pixels of each block is larger than the threshold. When the predetermined intra prediction mode is determined as the intra prediction mode of the corresponding block, the video decoding apparatus may know that the intra prediction mode of the corresponding block is determined as the predetermined intra prediction mode according to the variation of the pixel values of the adjacent pixels of each block and thus the video decoding apparatus may accurately select the intra prediction mode of the corresponding block, so that the video encoding apparatus 500 is not necessary to encode and transmit the mode identifier indicating the intra prediction mode for the corresponding block. As described above, in the embodiment of the present disclosure, when the intra prediction mode of the corresponding block is determined as the predetermined intra prediction mode, it is not necessary to transmit the mode bit indicating the intra prediction mode of the corresponding block, so that it is possible to decrease the bit quantity of the bit stream, thereby improving the compression efficiency, i.e. the encoding efficiency.

Further, the bitstream generator 530 includes a mode bit field identifier indicating a size or a position of the mode bit field in a macroblock header, a slice header, or a picture header. When the mode bit field is positioned before the coefficient bit field in the macroblock data, the slice data, or the picture data of the bitstream, the bitstream generator 530 generates the mode bit field identifier such that the mode bit field identifier indicates the size of the mode bit field and includes the mode bit field identifier in the header. On the contrary to this, when the mode bit field is positioned after the coefficient bit field in the macroblock data, the slice data, or the picture data of the bitstream, the bitstream generator 530 generates the mode bit field identifier such that the mode bit field identifier indicates the position of the mode bit field and includes the mode bit field identifier in the header.

Here, the mode bit field pointer may indicate the size or the position of the mode bit field and be included in one of the macroblock header, the slice header, and the picture header of the bitstream. The mode bit field and the coefficient bit field may be included in one of the macroblock data, the slice data, and the picture data of the bitstream. When the mode bit field is positioned before the coefficient bit field in one of the macroblock data, the slice data, and the picture data of the bitstream, the mode bit field identifier may indicate the size of the mode bit field, and when the mode bit field is positioned after the coefficient bit field in one of the macroblock data, the slice data, and the picture data of the bitstream, the mode bit field identifier may indicate the position of the mode bit field within the bitstream.

Figure 6:
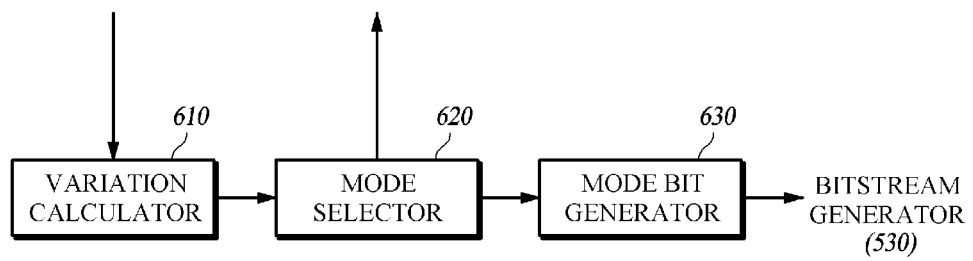
FIG. 6 is a block diagram schematically illustrating a prediction mode selection device for encoding according to an embodiment of the present disclosure.

FIG. 6 is a block diagram schematically illustrating a prediction mode selection device for encoding according to an embodiment of the present disclosure.

The prediction mode selection device for encoding according to the embodiment of the present disclosure may be implemented with the prediction mode selector 510 in FIG. 5. Hereinafter, the prediction mode selection device for encoding according to the embodiment of the present disclosure is called the prediction mode selector 510.

The prediction mode selector 510 includes a variation calculator 610, a mode selector 620, and a mode identifier generator 630.

The variation calculator 610 calculates a variation of the pixel values of the adjacent pixels of each block. For example, the variation calculator 610 may calculate the variation of the pixel values of the adjacent pixels of each block among the pixels included in the surrounding blocks by using a degree of scattering. Herein, the degree of scattering may be a statistical indicator indicating dispersion, a standard deviation, a mean deviation, and a quartile deviation of the adjacent pixels. Accordingly, the variation of the pixel values of the adjacent pixels may be an indicator indicating a degree of similarity between the adjacent pixels of each block. It may be considered that as the lower the variation is, the more similar the adjacent pixels of each block are to each other.

For example, on an assumption that the current block to encode one block among the blocks within the macroblock, the slice, or the picture has a size of N×M (N and M are natural numbers), in a case of calculating a variation of the pixel values of the adjacent pixels by using the standard deviation, the is variation calculator 610 may calculate a variation op of the pixel values of the adjacent pixels by using Equation 1.

$$\sigma_p = \sqrt{\left[\sum_{k=0}^{M}(u_k - m_u)^2 + \sum_{k=0}^{N}(l_k - m_l)^2\right]/8} \qquad \text{Equation 1}$$

$u_k$: pixel values of M adjacent pixels positioned in an upper end of the current block.

$l_k$: pixel values of N adjacent pixels positioned in a left side of the current block.

$m_u$: an average of $u_k$ $m_l$: an average of $l_k$

The mode selector 620 selects the predetermined intra prediction mode as the intra prediction mode of each block when the calculated variation is smaller than the threshold, and selects one of the plurality of intra prediction modes according to the predetermined mode determination method when the calculated variation is equal to or larger than the threshold, to select the selected one intra prediction mode as the intra prediction mode of each block. That is, the mode selector 620 calculates and appropriately sets the threshold, compares the variation of the pixel values of the adjacent pixels calculated by the variation calculator 610 with the threshold to evaluate a similarity of the adjacent pixels, and selects the intra prediction mode of each block according to the evaluated similarity.

According to the conventional compression technique, in order to select the intra prediction mode of the block, the RDO is performed for all the plurality of intra prediction modes and one intra prediction mode having the least rate-distortion cost is selected as the optimal intra prediction mode so that the intra prediction mode of the corresponding block is selected. However, when the similarity of the adjacent pixels of the block is high, it is efficient to select the intra prediction mode having the best prediction efficiency as the intra prediction mode of the corresponding block without necessarily performing the RDO for all the plurality of intra prediction modes.

Referring to FIG. 7, FIG. 7A illustrates pixels used in prediction of a block according to the intra 4×4 mode of H.264. 16 pixels a through p indicate pixels of the block and 13 pixels A through M indicate adjacent pixels of the block.

When the block illustrated in FIG. 7A is predicted using the nine prediction modes according to the intra 4×4 mode illustrated in FIG. 3, the block is intra predicted and encoded according to the nine prediction directions by using the pixel values of the already compressed and reconstructed pixels A through M.

For example, when the intra prediction is performed in a horizontal direction according to the horizontal mode which corresponds to prediction mode No. 1 illustrated in FIG. 3, pixels a, b, c, and d in the first row of the block are predicted as expressed in Equation 2.

$$a'=a-1$$
$$b'=b-1$$
$$c'=c-1$$
$$d'=d-1 \quad \text{Equation 2}$$

Then, when the intra prediction is performed in a diagonal down-left direction according to the diagonal down-left mode which corresponds to prediction mode No. 3 illustrated in FIG. 3, pixels a, b, c, and d in the first row of the block are predicted as expressed in Equation 3.

$$a'=a-[(A+2B+C)/4]$$
$$b'=b[(B+2C+D)/4]$$
$$c'=c-[(C+2D+E)/4]$$
$$d'=d-[(D+2E+F)/4] \quad \text{Equation 3}$$

In addition, the residual signal may be generated through performing the prediction using the pixel values of the adjacent pixels by using the similar method with respect to another prediction mode.

However, as illustrated in FIG. 7B, in a case in which the adjacent pixels of the block are all the same as N, when the intra prediction is performed in a horizontal direction according to the horizontal mode which corresponds to prediction mode No. 1 illustrated in FIG. 3, pixels a, b, c, and d in the first row of the block are predicted as expressed in Equation 4.

$$a'=a-N$$
$$b'=b-N$$
$$c'=c-N$$
$$d'=d-N \quad \text{Equation 4}$$

Further, when the intra prediction is performed in a diagonal down-left direction according to the diagonal down-left mode which corresponds to prediction mode No. 3 illustrated in FIG. 3, pixels a, b, c, and d in the first row of the block are predicted as expressed in Equation 5.

$$a'=a-[(N+2N+N)/4]=a-N$$
$$b'=b-[(N+2N+N)/4]=b-N$$
$$c'=c-[(N+2N+N)/4]=c-N$$
$$d'=d-[(N+2N+N)/4]=d-N \quad \text{Equation 5}$$

Through Equations 4 and 5, when the adjacent pixels of the block have the same pixel value as illustrated in FIG. 7B, it can be identified that the same prediction result may be obtained even if the block is predicted according to the nine prediction modes for the intra 4×4 mode prediction. Accordingly, when the adjacent pixels of the block have the same pixel value, it can be identified that the prediction performance or the compression performance is not degraded even when the intra prediction is performed according to any one prediction mode.

Further, when the adjacent pixels of the block are not the same but have the similar values, the predicted values in each prediction direction are similar to each other, so that the prediction performance or the compression performance is not degraded even when the intra prediction is performed according to any one prediction mode likewise to the case in which the adjacent pixels of the blocks are the same.

Accordingly, the mode selector 620 predetermines the intra prediction mode having the best prediction efficiency when the similarity of the adjacent pixels is high and selects the predetermined intra prediction mode as the intra prediction mode for the block with omission of the complicated process of selecting the intra prediction mode when it is determined that the similarity of the adjacent pixels is high because the variation calculated in the variation calculator 610 is smaller than the threshold. Through this, it is possible to reduce a calculation quantity for selecting the intra prediction mode of the block without degradation of the performance of the intra prediction, thereby achieving the simplification of the system implementation and decreasing the encoding speed to improve the compression performance.

Here, the predetermined intra prediction mode refers to the intra prediction mode set through the appointment between the video encoding apparatus and a video decoding apparatus, and the prediction may be performed with the same intra prediction mode in the decoding process through the predetermined intra prediction mode. For example, the predetermined intra prediction mode may be the intra prediction mode, such as the DC mode, which predicts the average of the pixel values of the adjacent pixels as the predicted value, but it is not limited thereto and other intra prediction modes may be set.

Further, when it is determined that the similarity of the adjacent pixels is low because the variation calculated in the variation calculator 610 is equal to or larger than the threshold, the mode selector 620 selects one intra prediction mode among the plurality of intra prediction modes according to the predetermined mode selection reference and selects the selected one intra prediction mode as the intra prediction mode of the block.

Here, the predetermined mode selection reference refers to a reference for selecting the optimal intra prediction mode for the current block among the plurality of intra prediction modes by the video encoding apparatus and the video decoding apparatus, and may be set through the appointment between the video encoding apparatus and the video decoding apparatus. For example, the predetermined mode selection reference may be the RDO, wherein the RDO refers to a method of predicting and encoding the current block according to each of the plurality of intra prediction modes and calculating the RD cost by using a predetermined cost function, and selecting the intra prediction mode having the least calculated RD cost as the optimal intra prediction mode.

The aforementioned cost function may include Sum of Absolute Value (SAD), Sum of Absolute Transformed Difference (SATD), Sum of Squared Difference (SSD), Mean of Absolute Difference (MAD), and Lagrangian function. The SAD is a value obtained by adding the absolute values of values of the residual signals of the 4×4 block. The SATD is a value obtained by adding the absolute values of coefficients generated through the application of the Hadamard Transform to the value of the residual signal of the 4×4 block. The SSD is a value obtained by squaring the value of the residual signal of the 4×4 block and adding the squared values, and the MAD is an average of the absolute values of the values of the residual signals of the 4×4 block. The Lagrangian function is a cost function configured by including information on a length of the bitstream in the cost function.

Further, when the mode selector 620 selects one intra prediction mode among the plurality of intra prediction modes according to the predetermined mode selection reference as the intra prediction mode of the block because the variation is equal to or larger than the threshold, a sequence of applying the plurality of intra prediction modes to the predetermined mode selection reference may be changed. Specifically, the mode selector 620 may select one intra prediction mode through sequentially applying each of the plurality of intra prediction modes to the predetermined mode selection reference, and in this case, the DC mode among the plurality of intra prediction modes may be finally applied to the predetermined mode selection reference.

This is because in the case where the variation is equal to or larger than the threshold (i.e. it is determined that the variation of the adjacent pixels is large), when a sequence of applying the DC mode in which the average of the pixel values of the adjacent pixels is used as the intra prediction value to the predetermined mode selection reference is the second as illustrated in FIG. 3, the probability that prediction mode No. 2 is determined as the optimal intra prediction mode becomes low. That is, when it is determined that the variation of the adjacent pixels is high through the comparison of the variation and the threshold, the probability that the DC mode is selected as the optimal intra prediction mode for the block is low, so that it is efficient to arrange the sequence of applying the DC mode to the predetermined mode selection reference as the last sequence as illustrated in FIG. 8.

Figure 8:
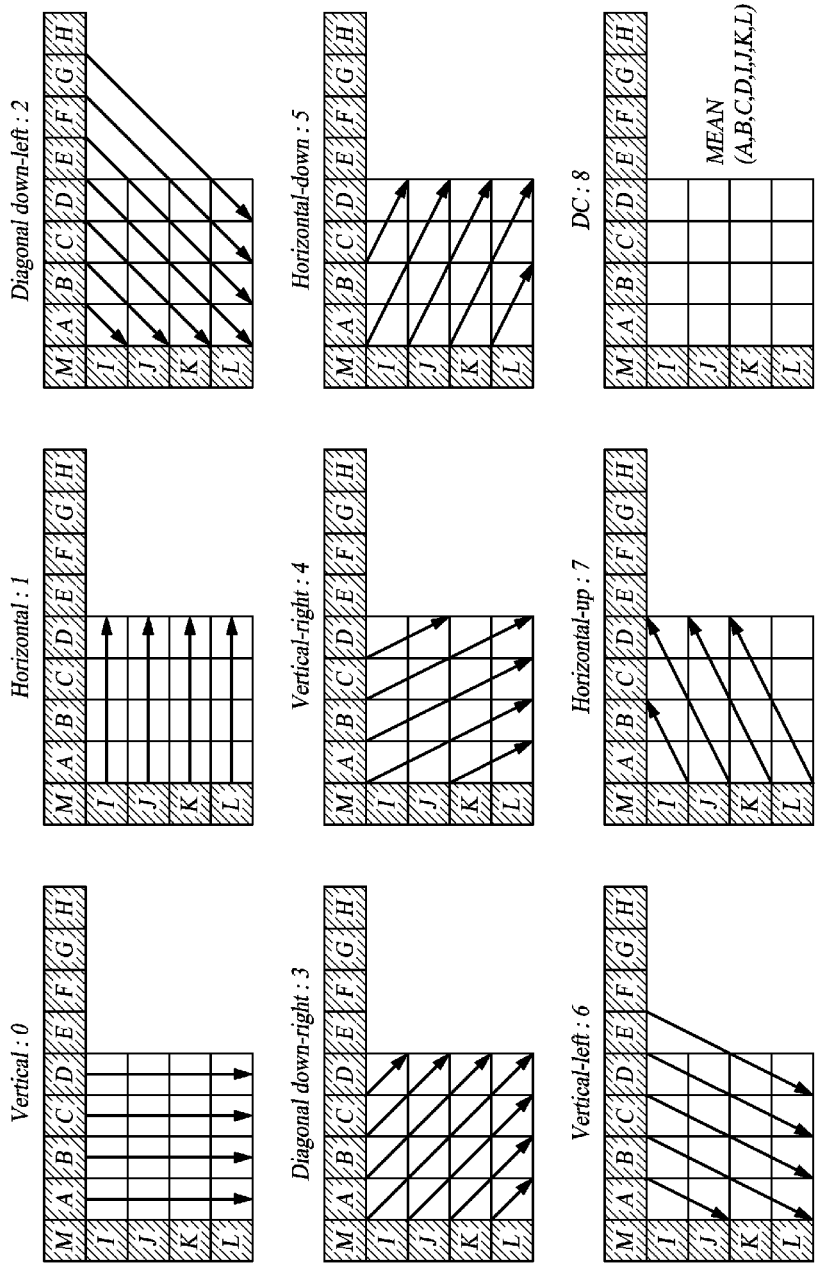
FIG. 8 is a diagram illustrating nine types of intra 4×4 prediction modes in which an intra prediction sequence is changed according to an embodiment of the present disclosure.

Referring to FIG. 8, when the sequence of the DC mode is changed from prediction mode No. 2 to prediction mode No. 8 among the nine prediction modes of the intra 4×4 mode, the optimal intra prediction mode for the block may be more rapidly selected. In this case, the nine prediction modes are applied to the predetermined mode selection reference in the sequence of the vertical mode, the horizontal mode, the diagonal down-left mode, the diagonal down-right mode, the vertical right mode, the horizontal down mode, the vertical left mode, the horizontal up mode, and the DC mode so that one optimal intra prediction mode among the nine prediction modes may be selected as the intra prediction mode for the block. To this end, as illustrated in FIG. 8, the vertical mode and the horizontal mode are maintained as prediction mode No. 0 and prediction mode No. 1, the diagonal down-left mode is changed to prediction mode No. 2, the diagonal down-right mode is changed to prediction mode No. 3, the vertical right mode is changed to prediction mode No. 4, the horizontal down mode is changed to prediction mode No. 5, the vertical left mode is changed to prediction mode No. 6, the horizontal up mode is changed to prediction mode No. 7, and the DC mode is changed to prediction mode No. 8. Similarly, in the sequence of the four intra prediction modes of the intra 16×16 mode, the sequence of the DC mode may be changed to the last sequence.

In order to efficiently compress the block, in addition to the variation of the pixel values of the adjacent pixels calculated in the variation calculator 610, the mode selector 620 should appropriately set the threshold which is the reference for evaluating the degree of the similarity of the adjacent pixels through the comparison with the calculated variation. That is, the threshold is information serving as the reference for determination of the degree of the similarity between the adjacent pixels of the current block. Accordingly, when the calculated variation of the pixel values of the adjacent pixels is smaller than the set threshold, it may be determined that the similarity between the adjacent pixels of the block is high. However, when the calculated variation of the pixel values of the adjacent pixels is equal to or larger than the set threshold, it may be determined that the similarity between the adjacent pixels of the block is low. To this end, the mode selector 620 may calculate and set the threshold.

The threshold may be adaptively calculated and set according to a quantization parameter (QP), a quantization step size ($Q_{step}$). Here, the QP is a parameter controlling the quantization and may be set as a predetermined integer. For example, the QP may be set with one of the integers 0 through 51 in the H.264. The quantization step size is information for controlling the quantization strength and is set based on the QP. For example, the H.264 is characterized in that whenever the QP is increased by 6, the quantization step size becomes doubled, so that the quantization step size may be set such that the quantization step size is increased two times whenever the QP is increased by 6.

The threshold may be calculated and set using Equation 6.

$$Th = \text{floor}(Q_X^{step} - Q_Y^P) \quad \text{Equation 6}$$

floor( ): function of rounding off to an integer
$Q_{step}$: quantization step size
QP: quantization parameter
X, Y: constant That is, the threshold may be set through substituting a specific constant for X and a specific constant for Y. The values for the constant X and/or constant Y may be changed according to the quantization parameter and/or a set value of the quantization step size or a desired threshold and substituted.

The mode identifier generator 630 may generate and output the mode identifier indicating the selected intra prediction mode of the block. In this case, the mode identifier generator 630 may generate and output the mode identifier only when the variation calculated by the variation calculator 610 is equal to or larger than the threshold, and may not generate the mode identifier when the variation is smaller than the threshold. The mode identifier is encoded into the mode bit by the bitstream generator 530 and is included in the bitstream together with the coefficient bit generated by encoding the residual block of the block. The mode identifier generator 630 generates the mode identifier and encodes the generated mode identifier to transmit the mode to the bitstream generator 530, and the bitstream generator 530 configures the transmitted mode bit as the mode bit field and inserts the mode bit field into the bitstream. That is, the mode identifier may be encoded by the bitstream generator 530, but may be encoded by the mode identifier generator 630 and be inserted into the bitstream even without being encoded.

Figure 9:
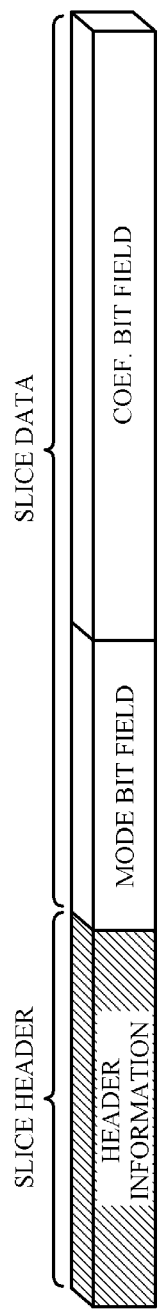
FIGS. 9 and 10 are diagrams illustrating bitstreams generated in the unit of macroblocks according to an embodiment of the present disclosure.

FIGS. 9 and 10 are diagrams illustrating the bitstream generated in the unit of macroblocks according to the embodiment of the present disclosure.

The bitstream for the plurality of blocks may be configured by the bitstream generator 530 as illustrated in FIG. 10. For the comparison with the structure of the bitstream according to the embodiment of the present disclosure illustrated in FIG. 10, FIG. 9 illustrates the structure of the bitstream generated according to the conventional compression technique.

Referring to FIG. 9, the mode bit field including the collected mode bits for the plurality of blocks and the coefficient bit field including the collected coefficient bits may be included in the slice data, and in order to accurately extract the mode bit for the identification of the intra prediction mode for each of the plurality of blocks by the video decoding apparatus, the bitstream is configured such that the mode bit field is positioned before the coefficient bit field in the slice data. The video decoding apparatus extracts the slice data from the bitstream transmitted as illustrated in FIG. 9, extracts a predetermined quantity of bits as the mode bit field, and the remaining data as the coefficient bit field, and stores the extracted bits and data in a buffer, and sequentially fetches the mode bits of the mode bit field in the prediction of the respective blocks and identifies the intra prediction mode of each block.

In the conventional compression technique, the mode bits generated by encoding the mode identifiers indicating the intra prediction modes of the respective blocks are all included in the mode bit field of the bitstream, so that the video decoding apparatus may accurately extract the mode bit field by extracting the predetermined quantity of bits from a beginning bit of the slice data of the bitstream as described above. However, according to the embodiment of the present disclosure, the mode bits generated through the encoding of the mode identifiers indicating the intra prediction modes of all blocks are not included in the mode bit field, but the mode bits generated through the encoding of the mode identifiers indicating the intra prediction modes determined according to the predetermined mode determination method because the variation of the pixel values of the adjacent pixels is larger than the threshold, so that the video decoding apparatus may not know the quantity of the bits from the beginning bit of the slice data, which is included in the bit of the mode bit field, so that it may not accurately extract the mode bit field.

In order to solve the aforementioned problem, in the embodiment of the present disclosure, as illustrated in FIG. 10, the mode bit field identifier is inserted in the slice header, and the video decoding apparatus receives the bitstream and then accurately extracts the mode bit field through the mode bit field identifier inserted in the slice header.

Referring to FIG. 10, the bitstream is configured such that the mode bit field and the coefficient bit field are included in the slice data and the mode bit field pointer indicating the size or the position of the mode bit field is inserted in the slice header according to the embodiment of the present disclosure.

Figure 10A:
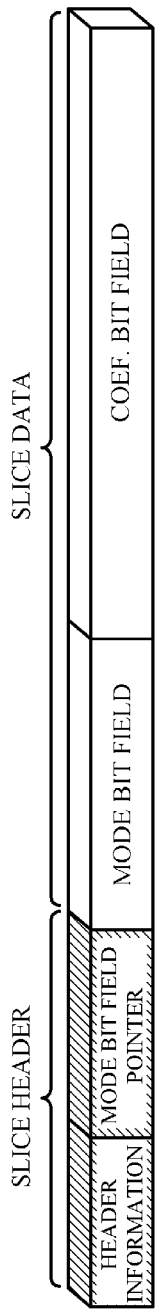

FIG. 10A is an example of the structure of the bitstream according to the embodiment of the present disclosure, and represents a case in which the mode bit field is positioned before the coefficient bit field in the slice data. As described above, according to the embodiment of the present disclosure, the mode bits generated through encoding the mode identifiers indicating the intra prediction modes of all blocks are not included in the mode bit field, but only the mode bits generated through encoding the mode identifiers indicating the intra prediction modes determined according to the predetermined mode determination method are included in the mode bit field, so that the mode bit field identifier is inserted in the slice header such that the video decoding apparatus may accurately extract the mode bit field from the slice data. In this case, the mode bit field identifier indicates the size of the mode bit field. When the video decoding apparatus receives the bitstream illustrated in FIG. 10A, the video decoding apparatus analyzes the slice header of the bitstream to extract the mode bit field pointer and extracts data as large as the size indicated by the mode bit field pointer from the beginning bit of the slice data, thereby accurately extracting the mode bit field.

Figure 10B:
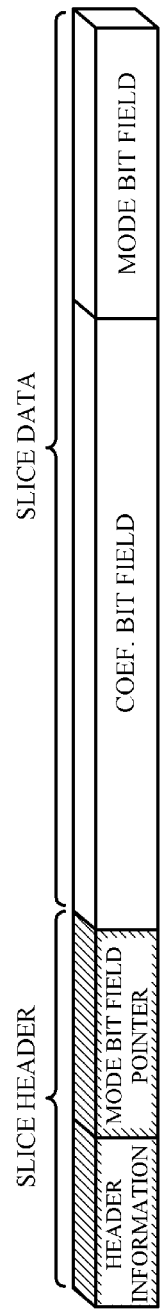

FIG. 10B is another example of the bitstream according to the embodiment of the present disclosure and illustrates a case in which the mode bit field is positioned after the coefficient bit field in the slice data. The bitstream may be configured such that the mode bit field is positioned before the coefficient bit field in the slice data as illustrated in FIG. 10A, but the bitstream may be configured such that the mode bit field is positioned after the coefficient bit field in the slice data depending on the necessity of the implementation. In this case, the video decoding device may not know which is the final bit included in the coefficient bit field and which is the beginning bit included in the mode bit field in the slice data. Accordingly, in this case, as illustrated in FIG. 10B, the mode bit field pointer indicating the position of the mode bit field is inserted into the slice header, so that the video decoding apparatus receiving the bitstream may accurately extract the mode bit field and the coefficient bit field from the slice data by using the mode bit field pointer.

As described above, according to the embodiment of the present disclosure, as illustrated in FIGS. 10A and 10B, the mode bit field pointer indicates the size or the position of the mode bit field so that the bitstream may be flexibly configured.

In FIGS. 10A and 10B, it is described that the mode bit field including the mode bits generated by encoding the mode identifiers indicating the intra prediction modes of the block and the coefficient bit field including the coefficient bits for the residual block of the block are all included in the slice data, and the mode bit field pointer for the mode bit field is included in the slice header. However, the mode bit field and the coefficient bit field may be included in data, such as the macroblock data or the picture data, in the various units for the encoding, and the mode bit field pointer may be included in the header, such as the macroblock header or the picture header, of the various units for the encoding. However, when the mode bit field pointer is included in the macroblock header, the mode bit field and the coefficient bit field may be included in the macroblock data, and when the mode bit field pointer is included in the picture header, the mode bit field and the coefficient bit field may be included in the picture data.

Figure 11:
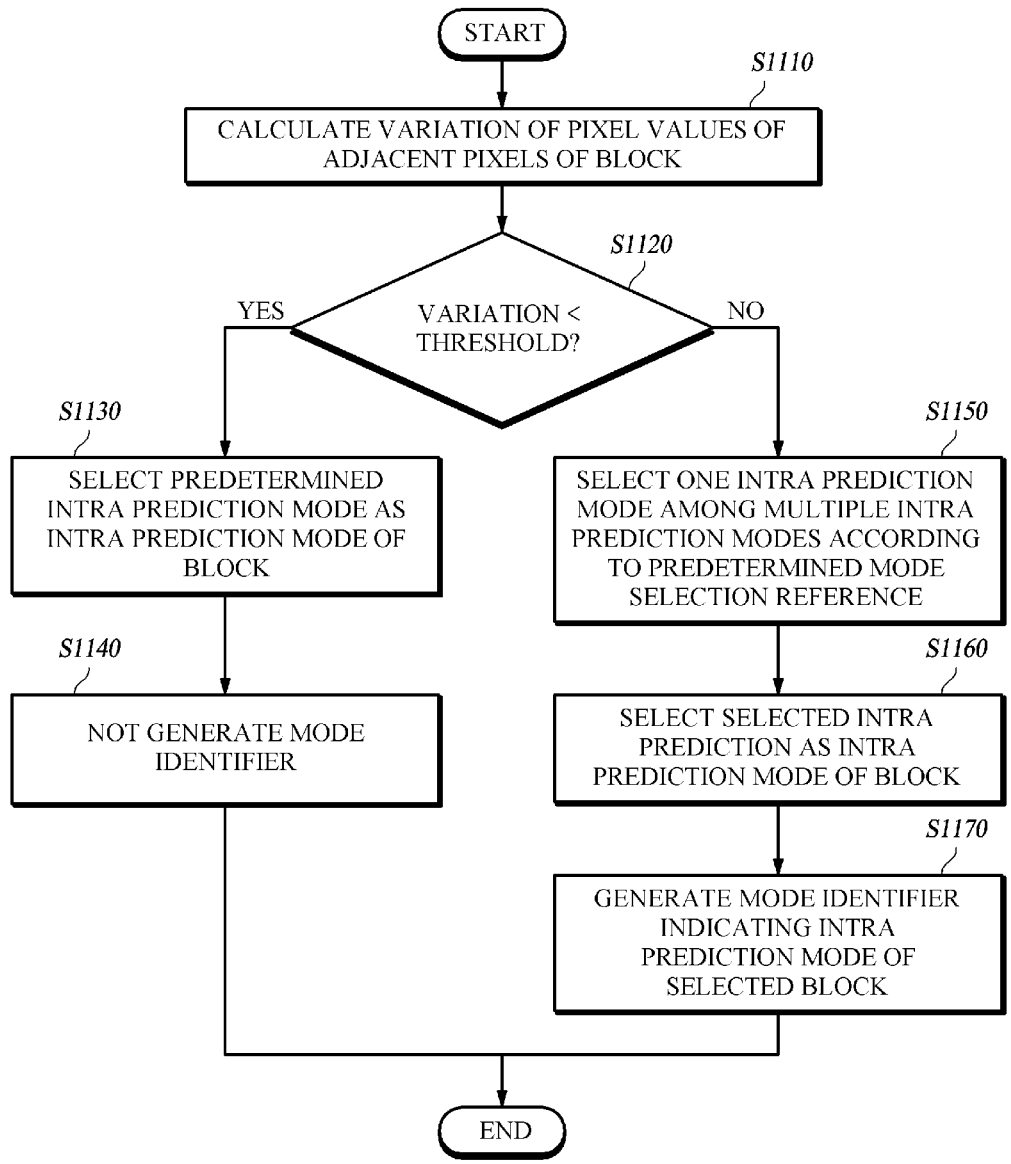
FIG. 11 is a flowchart illustrating a method of selecting a prediction mode for encoding according to an embodiment of the present disclosure.

FIG. 11 is a flowchart illustrating a method of selecting a prediction mode for encoding according to an embodiment of the present disclosure.

In order to intra predict a block, an intra prediction mode of the block is selected. To this end, the prediction mode selection apparatus, i.e. the prediction mode selector 510 calculates a variation of pixel values of adjacent pixels of the block (S1110) and compares the calculated variation with a threshold (S1120).

When the calculated variation is smaller than the threshold as a result of a comparison result of step S1110, the prediction mode selector 510 determines that the similarity of the adjacent pixels of the block is high and selects a predetermined intra prediction mode as an intra prediction mode of the block (S1130). In this case, since the predetermined intra prediction mode selected as the intra prediction mode of the block is already appointed in the video decoding apparatus so that the video decoding apparatus may know the selected intra prediction mode, the prediction mode selector 510 does not generate a mode identifier for indicating the intra prediction mode of the block (S1140). Even in a case of the generation of the mode identifier, the mode identifier is not encoded into the mode bit or is not included in the mode bit field.

Further, when the calculated variation is equal to or larger than the threshold as a result of a comparison result of step S1110, the prediction mode selector 510 determines that the similarity of the adjacent pixels of the block is low and selects one intra prediction mode among a plurality of intra prediction modes according to a predetermined mode selection reference (S1150), selects the selected intra prediction mode as an intra prediction mode of the block (S1160), and generates a mode identifier indicating the selected intra prediction mode of the block (S1170). The generated prediction mode bit is included in the bitstream.

As described above, according to the embodiment of the present invention, when the prediction mode selector 510 selects the intra prediction mode of the block, the prediction mode selector 510 does not perform a complicated process of selecting the optimal intra prediction mode according to the mode selection reference, such as the RDO, but selects the predetermined intra prediction mode as the intra prediction mode of the block in a particular case (in a case where the variation of the pixel values of the adjacent pixels is smaller than the threshold), so that it is possible to decrease the calculation quantity for selecting the intra prediction mode, thereby achieving the simplification of the system implementation, and improve the encoding speed, thereby improving the compression performance as well.

Figure 12:
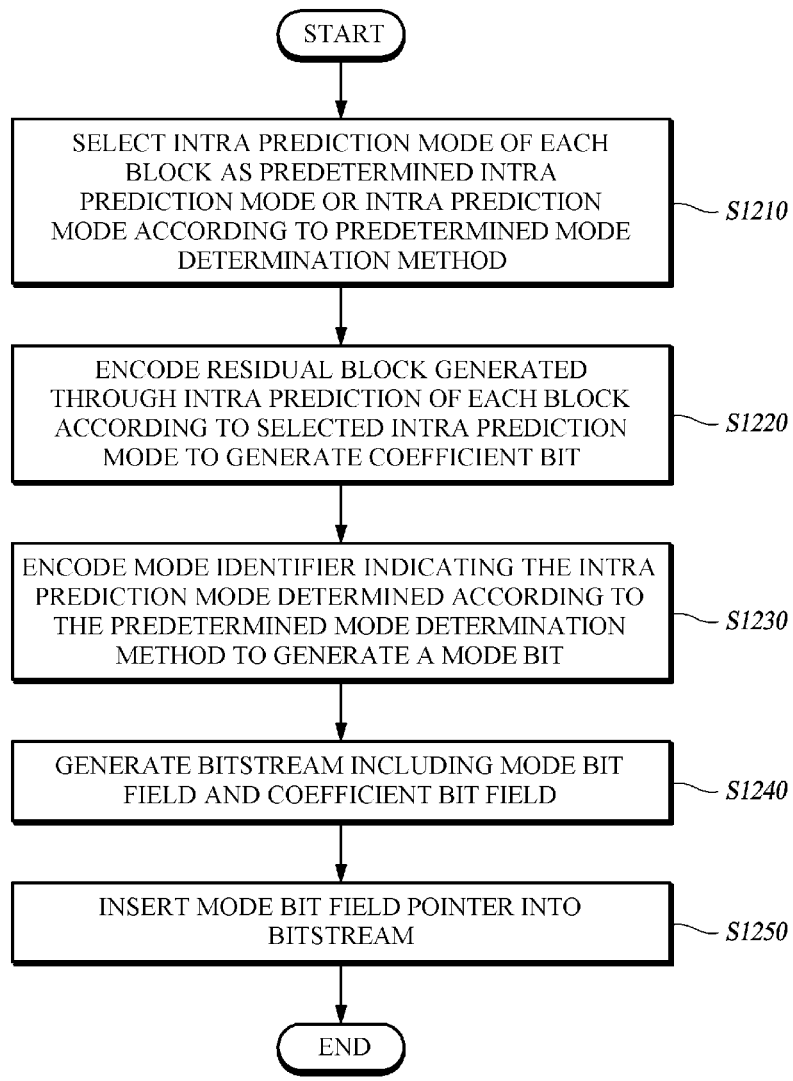
FIG. 12 is a flowchart illustrating a video encoding method according to an embodiment of the present disclosure.

FIG. 12 is a flowchart illustrating a video encoding method according to an embodiment of the present disclosure.

When the video encoding apparatus 500 encodes an input video in the unit of macroblocks or sub blocks, a block having a size of 16×16, a block having a size of 8×8, and a block having a size of 4×4, the video encoding apparatus 500 selects an intra prediction mode of each block to be encoded in the input video as the predetermined intra prediction mode or an intra prediction mode according to a predetermined mode determination method (S1210), encodes a residual block generated through the intra prediction of each block according to the selected intra prediction mode to generate a coefficient bit (S1220), encodes a mode identifier indicating the intra prediction mode determined according to the predetermined mode determination method to generate a mode bit (S1230), generates a bitstream including a mode bit field including a mode bit for one or more blocks and a coefficient bit field including a coefficient bit for each block (S1240), and inserts a mode bit field pointer for identifying the mode bit field into the bitstream (S1250).

As described above, according to the embodiment of the present disclosure, the present disclosure selects the intra prediction mode of the current block according to the variation of the pixel values of the adjacent pixels of the block to reduce the calculation quantity for selecting the intra prediction mode and saving a time for the selection, thereby improving the encoding efficiency and the compression efficiency, and may insert or not insert the mode bit indicating the intra prediction mode into the bitstream depending on the variation of the pixel values of the adjacent pixels of the block to reduce the data size of the bitstream, thereby improving the compression efficiency as well.

Figure 13:
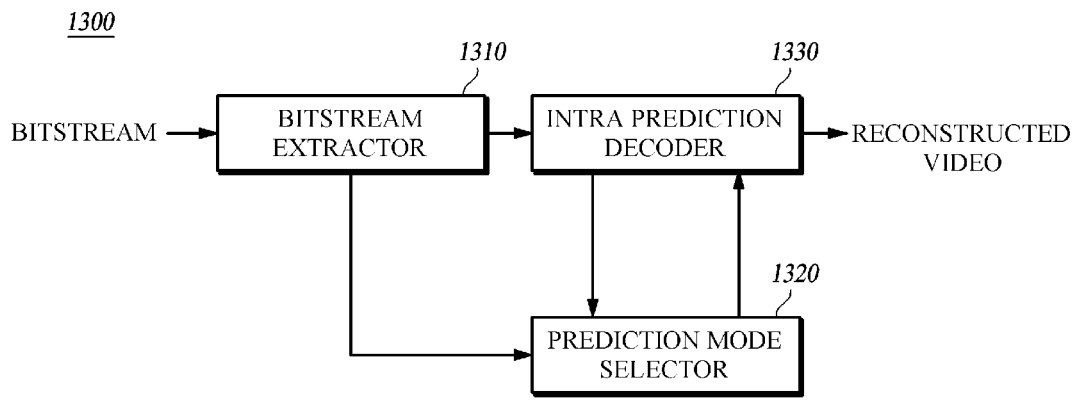
FIG. 13 is a block diagram schematically illustrating a video decoding apparatus according to an embodiment of the present disclosure.

FIG. 13 is a block diagram schematically illustrating a video decoding apparatus according to an embodiment of the present disclosure.

The video decoding apparatus 1300 according to the embodiment of the present disclosure includes a bitstream extractor 1310, a prediction mode selector 1320, and an intra prediction decoder 1330.

The bitstream extractor 1310 extracts a mode bit field pointer from a bitstream and extracts a mode bit field and a coefficient bit field from the bitstream by using the extracted mode bit field pointer. Here, the mode bit field pointer may be extracted from one of a macroblock header, a slice header, and a picture header of the bitstream, and the mode bit field and the coefficient bit field may be extracted from one of macroblock data, slice data, and picture data of the bitstream.

Further, when the mode bit field pointer indicates a size of the mode bit field, the bitstream extractor 1310 may extract the mode bit field from one of the macroblock data, the slice data, and the picture data of the bitstream as large as the size of the mode bit field before the coefficient bit field. When the mode bit field pointer indicates a position of the mode bit field, the bitstream extractor 1310 may extract the coefficient bit field from one of the macroblock data, the slice data, and the picture data of the bitstream up to the position of the mode bit field before the mode bit field. The bitstream extractor 1310 may decode the mode bits of the extracted mode bit field, reconstruct the mode identifier for one or more blocks, and temporarily store the reconstructed mode identifier, and may store the coefficient bits of the respective blocks of the extracted coefficient bit field in another buffer.

The prediction mode selector 1320 selects a predetermined intra prediction mode or the intra prediction mode indicated by one or more mode identifiers as an intra prediction mode of each block to be decoded. For example, the prediction mode selector 1320 calculates a variation of pixel values of adjacent pixels of each block to be decoded, and selects the predetermined intra prediction mode as an intra prediction mode of the corresponding block when the variation of the pixel values of the adjacent pixels of the block is smaller than a threshold. Further, when the variation of the pixel values of the adjacent pixels of the block is equal to or larger than the threshold (i.e. when the intra prediction mode of the corresponding block is determined as the intra prediction mode according to a predetermined mode determination method in the video encoding apparatus 500), the prediction mode selector 1320 may sequentially fetch one or more mode identifiers stored in the buffer one by one and select the intra prediction mode indicated by the fetched mode identifier as the intra prediction mode of the corresponding block.

Here, the predetermined intra prediction mode may be the intra prediction mode (e.g. the DC mode in the H.264/AVC) for predicting the average of the pixel values of the adjacent pixels of the block as the predicted pixel value, but it is not essentially limited thereto, and if the intra prediction mode is already appointed with the video encoding apparatus 500, any intra prediction mode is available. The variation may be calculated using the degree of scattering, and the degree of scattering may include dispersion, a standard deviation, a mean deviation, and a quartile deviation. The threshold may be set according to a quantization parameter and the quantization step size of the current block.

The intra prediction decoder 1330 decodes the coefficient bit of the coefficient bit field temporarily stored in another buffer to reconstruct the residual block of each block and reconstructs each block by using the predicted block obtained by the prediction of each block according to the intra prediction mode of each block selected by the prediction mode selector 1320 and the reconstructed residual block to reconstruct each block. The intra prediction decoder 1330 may be configured the same as the video decoding apparatus 200 aforementioned through FIG. 2. Specifically, the intra prediction decoder 1330 decodes the coefficient bit of the coefficient bit field extracted from the bitstream to reconstruct the transformed and quantized block having the quantized transform coefficients of each block, and inversely quantizes and inversely transforms the quantized transform coefficients to reconstruct the residual block, predicts each block according to the intra prediction mode of each block selected by the prediction mode selector 1320 to generate the predicted block, and adds the reconstructed residual block and the predicted block to reconstruct each block. In this case, the process of the inverse quantization and/or the inverse transform may be optionally omitted depending on the implementation method.

Figure 14:
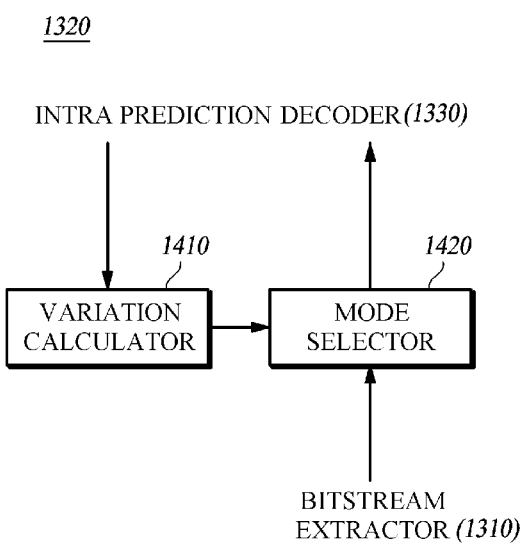
FIG. 14 is a block diagram schematically illustrating a prediction mode selecting device for decoding according to an embodiment of the present disclosure.

FIG. 14 is a block diagram schematically illustrating a prediction mode selecting device for decoding according to an embodiment of the present disclosure.

The prediction mode selecting device 1320 for decoding according to the embodiment of the present disclosure may be implemented with the prediction mode selector 1320 of FIG. 13. For the convenience of description, the prediction mode selecting device for decoding according to the embodiment of the present disclosure is called the prediction mode selector 1320 in the description to follow. The prediction mode selector 1320 includes a variation calculator 1410 and a mode selector 1420.

The variation calculator 1410 calculates a variation of pixel values of adjacent pixels of each block to be decoded. The variation calculator 1410 has the same function as that of the variation calculator 510 aforementioned with reference to FIG. 6, so its detailed description will be omitted. However, the variation calculator 510 aforementioned with reference to FIG. 6 receives the pixel values of the adjacent pixels of each block from the intra prediction encoder 520, but the variation calculator 1410 may receive the pixel values of the adjacent pixels of the current block from the intra prediction decoder 1330.

When the variation of the pixel values of the adjacent pixels of the block calculated by the variation calculator 1410 is smaller than a threshold, the mode selector 1420 selects a predetermined intra prediction mode as an intra prediction mode of the corresponding block, and when the variation of the pixel values of the adjacent pixels of the block calculated by the variation calculator 1410 is equal to larger than a threshold, the mode selector 1420 selects the intra prediction mode indicated by a mode identifier temporarily stored in the buffer as an intra prediction mode of the corresponding block. In this case, the mode selector 1420 may sequentially fetch one or more mode identifiers stored in the buffer one by one, selects the intra prediction mode indicated by the fetched mode identifier as the intra prediction mode of the corresponding block, and delete the corresponding mode identifier in the temporary buffer, and then when a variation of pixel values of adjacent pixels of another block is equal to or larger than the threshold, the mode selector 1420 may repeat the process of fetching a next mode identifier in the buffer to select the intra prediction mode and deleting the corresponding mode identifier, thereby accurately selecting the intra prediction modes of all blocks to be decoded.

Specifically, when the variation calculated by the variation calculator 1410 is smaller than the threshold, the mode selector 1420 determines that the similarity of the adjacent pixels of the corresponding block is high and selects the predetermined intra prediction mode appointed with the video encoding apparatus 500 as the intra prediction mode of the current block. Further, when the variation calculated by the variation calculator 1410 is equal to or larger than the threshold, the mode selector 1420 determines that the similarity of the adjacent pixels of the corresponding block is low and fetches the mode identifier extracted and reconstructed from the bitstream and stored in the buffer and selects the intra prediction mode indicated by the prediction mode bit as the intra prediction mode of the current block. The selected intra prediction mode of each block is transferred to the intra prediction decoder 1330 and used in the prediction of the respective blocks by the intra prediction decoder 1330.

Figure 15:
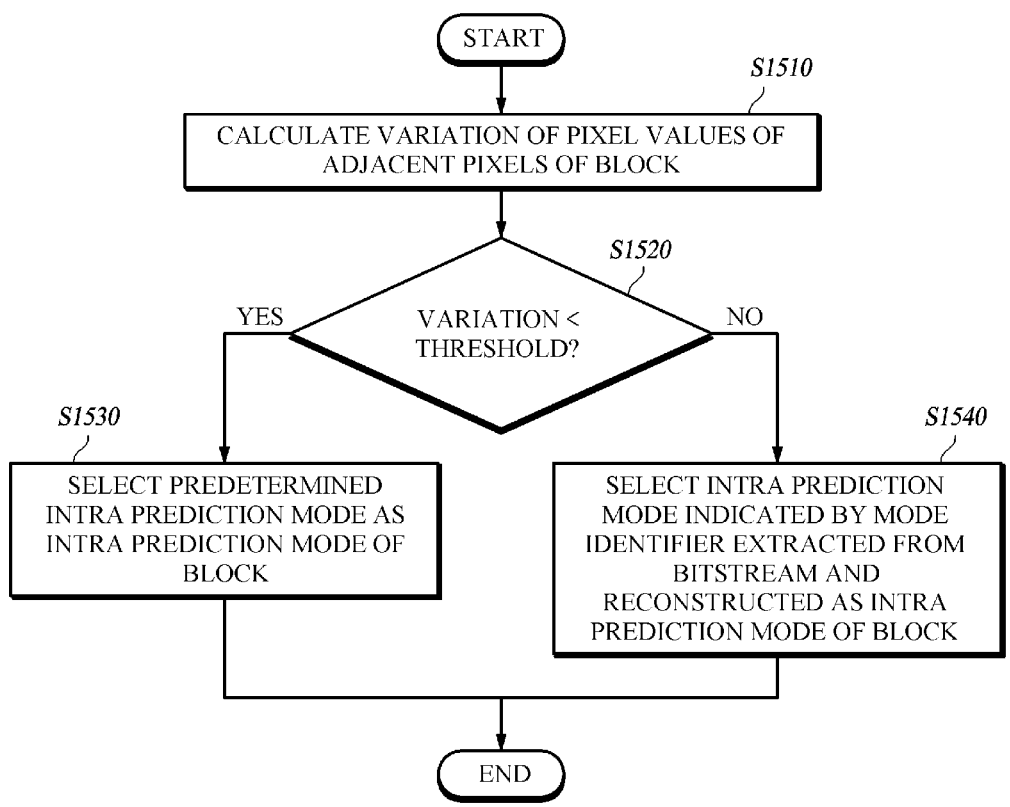
FIG. 15 is a flowchart illustrating a method of selecting a prediction mode for decoding according to an embodiment of the present disclosure.

FIG. 15 is a flowchart illustrating a method of selecting a prediction mode for decoding according to an embodiment of the present disclosure.

The prediction mode selecting apparatus, i.e. the prediction mode selector 1320 of the video decoding apparatus 1330 calculates a variation of pixel values of adjacent pixels of each block (S1510) and compares the calculated variation with a threshold (S1520) in order to select an intra prediction mode of each block.

When the calculated variation is smaller than the threshold as a result of comparison of step S1520, the prediction mode selector 1320 selects a predetermined intra prediction mode as an intra prediction mode of the corresponding block (S1530). In this case, the predetermined intra prediction mode is referred to as the intra prediction mode which has been already appointed with the video encoding apparatus 500 to be set.

When the calculated variation is equal to or larger than the threshold as a result of comparison of step S1520, the prediction mode selector 1320 selects the intra prediction mode indicated by a mode identifier extracted and reconstructed from the bitstream as an intra prediction mode of the corresponding block (S1540).

Figure 16:
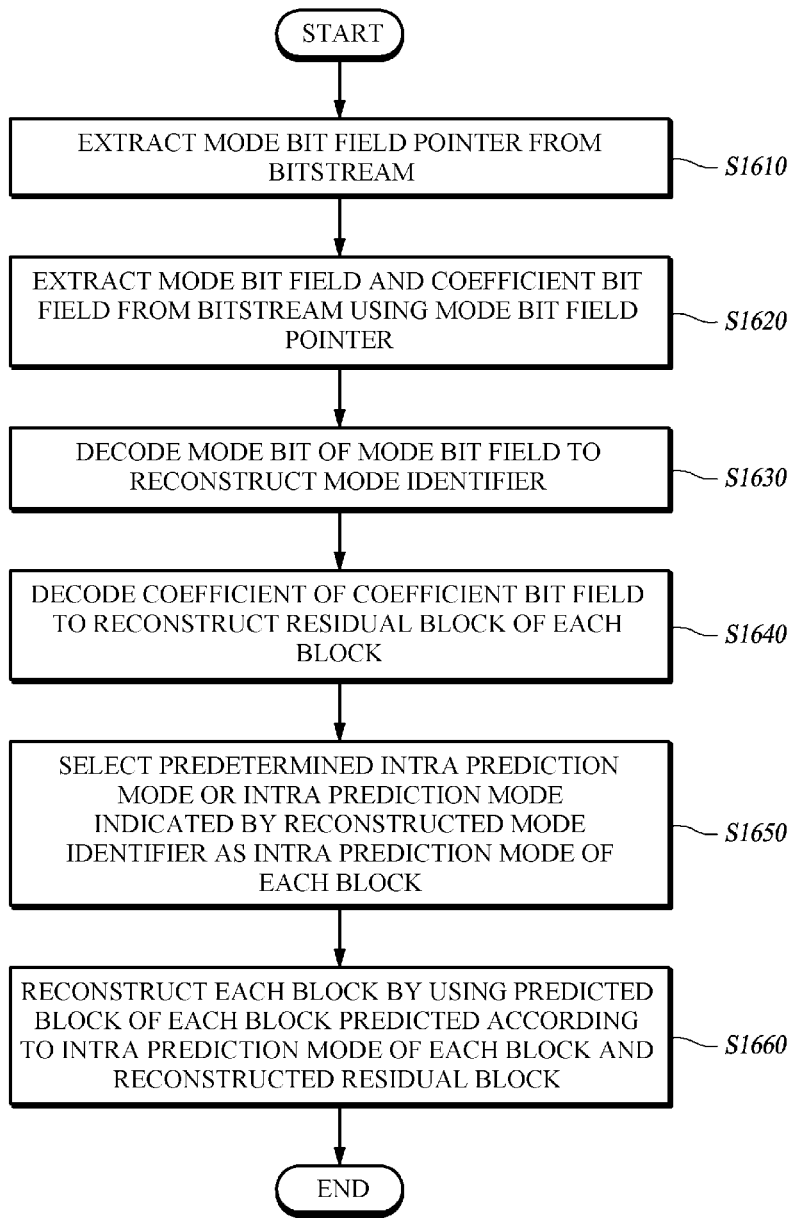
FIG. 16 is a flowchart illustrating a video decoding method according to an embodiment of the present disclosure.

FIG. 16 is a flowchart illustrating a video decoding method according to an embodiment of the present disclosure.

The video decoding apparatus 1300 extracts a mode bit field pointer from the bitstream (S1610), extracts a mode bit field and a coefficient bit field from the bitstream by using the extracted mode bit field pointer (S1620), and decodes the mode bit of the mode bit field to reconstruct one or more mode identifiers (S1630).

The video decoding apparatus 1300 decodes a coefficient bit of the coefficient bit field to reconstruct a residual block of each block to be decoded (S1640), selects the predetermined intra prediction mode or the intra prediction mode indicated by the reconstructed one or more mode identifiers as the intra prediction mode of each block to be decoded (S1650), and reconstructs the each block by using the predicted block generated through the prediction of each block according to the selected intra prediction mode of each block and the reconstructed residual block (S1660).

For example, on an assumption that the macroblock having a size of 16×16 is intra prediction encoded in the unit of sub blocks having a size of 4×4 and the bitstream includes the coefficient bit and the mode bit for each sub block in the unit of slices, the bitstream includes the coefficient bit field of the slice data including the coefficient bits for all sub blocks and the mode bit field of the slice data selectively including the mode bit for the sub block of which the intra prediction mode is selected according to a predetermined mode determination method depending on a variation of pixel values of adjacent pixels of a corresponding sub block as illustrated in FIG. 10A or 10B. Further, a slice header includes a mode bit field point indicating a size or a position of the mode bit field.

In this case, the video decoding apparatus 1300 extracts the mode bit field pointer from the slice header of the bitstream, first extracts the mode bit field from the slice data as large as the size indicated by the extracted mode bit field pointer and the remaining as the coefficient bit field or first extracts the mode bit field from the position indicated by the mode bit field pointer from the slice data and the remaining as the coefficient bit field, decodes the mode bit of the extracted mode bit field to reconstruct the mode identifier for one or more sub blocks, stores the reconstructed one or more mode identifiers in a memory, such as the buffer, and stores the coefficient bits of the coefficient bit field in another memory, such as another buffer. The mode identifiers and the coefficient bits stored in the respective buffers are used in the decoding of the coefficient bits for all sub blocks or the selection of the intra prediction mode of the current block according to the variation of the pixel values of the adjacent pixels of the respective sub blocks.

Further, in the selection of the intra prediction modes of the respective blocks, the video decoding apparatus 1300 calculates the variation of the pixel values of the adjacent pixels of each block, selects the predetermined intra prediction mode as an intra prediction mode of the corresponding block without fetching the mode identifier stored in the buffer when the calculated variation is smaller than a threshold, and sequentially fetches the mode identifiers stored in the buffer when the calculated variation is equal to or larger than a threshold and selects the intra prediction mode indicated by the fetched mode identifier as an intra prediction mode of the corresponding block.

The video decoding apparatus 1300 predicts each sub block by using the selected intra prediction mode, decodes the coefficient bit for each sub block, and reconstructs the residual block of each block, and then repeats the aforementioned process for a next sub block. In this case, the coefficient bit of the sub block for which the decoding process is completed and the mode identifier may be deleted in the memory, such as the buffer, and thus it is possible to increase the usable quantity of the memory of the system.

In the aforementioned description, it has been described that the video encoding apparatus 500 according to the embodiment of the present disclosure calculates the variation of the pixel values of the adjacent pixels of each block, compares the calculated variation with the threshold, and determines the intra prediction mode determined according to the predetermined mode determination method, i.e. the optimal intra prediction mode as the intra prediction mode of each block when it is determined that the similarity of the adjacent pixels of each block is low, and compares the calculated variation with the threshold, and determines the predetermined intra prediction mode as the intra prediction mode of each block when it is determined that the similarity of the adjacent pixels of each block is high, and does not encode the mode identifier for identifying the intra prediction mode for the block for which the predetermined intra prediction mode is determined as the intra prediction mode of the corresponding block because the similarity of the adjacent pixels of the block is high.

In this case, as described above, the video encoding apparatus 500 may determine the similarity of the pixel values of the adjacent pixels of each block through comparing the variation calculated by using the degree of scattering of the pixel values of the adjacent pixels of each block with the threshold, but the video encoding apparatus 500 may also determine the similarity of the pixel values of the adjacent pixels of each block by using the predicted block of each block or the quantized transform coefficients of the residual block for the predicted block. That is, in order to determine the similarity of the adjacent pixels of each block, the video encoding apparatus 500 predicts the current block according to each of a plurality of available intra prediction modes (e.g. nine intra prediction modes for the intra 4×4 prediction of the H. 264) to generate the predicted block and determines that the similarity of the adjacent pixels of each block is high when the quantization transform coefficients generated through the transform and the quantization of the residual block of the predicted block are the same for the respective intra prediction modes, and determines that the similarity of the adjacent pixels of each block is low when the quantization transform coefficients generated through the transform and the quantization of the residual block of the predicted block are not the same for the respective intra prediction modes.

For example, in order to determine the similarity of the adjacent pixels for any one block among the multiple blocks to determine the intra prediction mode for the corresponding block, the video encoding apparatus 500 predicts one block among the multiple blocks according to the nine available intra prediction modes to generate nine predicted blocks, transforms and quantizes the nine predicted blocks to generate nine transformed blocks, determines if the quantized transform coefficients of the nine transformed blocks are the same at the respective positions, determines that the similarity of the adjacent pixels of the corresponding block is high when the quantized transform coefficients of the nine transformed blocks are the same at the respective positions, and determines the predetermined intra prediction mode according to the result of the determination as the intra prediction mode of the corresponding block, and determines that the similarity of the adjacent pixels of the corresponding block is low when the quantized transform coefficients of the nine transformed blocks are not the same at the respective positions, and determines the intra prediction mode determined according to the predetermined mode determination method in accordance with the result of the determination as the intra prediction mode of the corresponding block.

Figure 17:
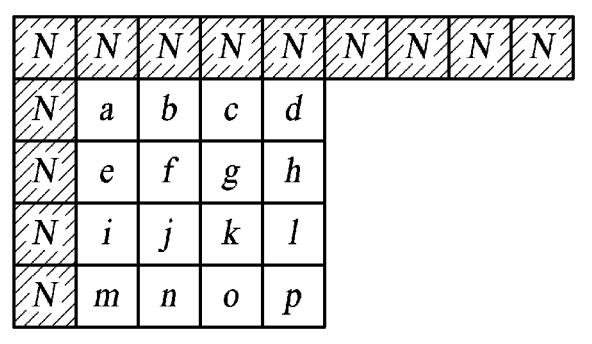

Referring to FIG. 17 illustrating the case in which the pixel values of the adjacent pixels of the block are the same, in the case where the pixel values of the adjacent pixels of the block to be encoded are the same, even when the corresponding block is predicted using any intra prediction mode, the same predicted blocks are generated. When the generated predicted blocks are subtracted from the corresponding block, the same residual blocks are generated. For example, four residual signals a, b, c, and d of the respective residual blocks generated through predicting the block illustrated in FIG. 17 by using each of the horizontal mode and the diagonal down-left mode to generate the predicted blocks and subtracting the respective predicted blocks from the corresponding block may be calculated as Equation 7 and Equation 8.

$$a'=a-N,$$
$$b'=b-N,$$
$$c'=c-N,$$
$$d'=d-N \quad \text{Equation 7}$$
$$a'=a-((N+2N+N/4)=a-N$$
$$b'=b-((N+2N+N/4)=b-N$$
$$c'=c-((N+2N+N/4)=c-N$$
$$d'=d-((N+2N+N/4)=d-N \quad \text{Equation 8}$$

As can be seen through Equations 7 and 8, when the pixel values of the adjacent blocks of a block are the same, the quantized transform coefficients of the corresponding block become the same even if the block is predicted by using any one intra prediction mode.

Further, in a case of the performance of the quantization along with the transform, when the pixel values of the adjacent pixels of the block are not the same, but are similar within a certain range, the quantized transform coefficients for the corresponding block become all the same even in the prediction of the block by using any one intra prediction mode due to the quantization. Accordingly, in a case in which the corresponding block is predicted with various intra prediction modes and the quantized transform coefficients obtained through the transform and quantization of the residual blocks are the same for the respective intra prediction modes, even if the block is predicted with the predetermined intra prediction mode and encoded without the determination of one intra prediction mode having the optimum performance among the various intra prediction modes, the compression efficiency is not degraded.

As described above, in the determination of the intra prediction mode of a corresponding block, the video encoding apparatus 500 may calculate the variation of the pixel values of the adjacent pixels of the corresponding block, compare the calculated variation with the threshold, and determine the similarity of the pixel values of the adjacent pixels, but may also determine the similarity of the pixel values of the adjacent pixels depending on whether the quantized transform coefficients generated through predicting the corresponding block with various intra prediction modes and transforming and quantizing the residual blocks are the same for the respective intra prediction modes.

In addition, the video encoding apparatus 500 may also determine the similarity of the pixel values of the adjacent pixels depending on whether the quantized transform coefficients generated through transforming and quantizing the predicted blocks generated through the prediction with various intra prediction modes are the same for the respective intra prediction modes, without predicting the corresponding block with the various intra prediction modes and transforming and quantizing the residual blocks. This is because when the quantized transform coefficients of the predicted blocks are the same for the respective intra prediction modes, it is possible to obtain the same result as the case where the quantized transform coefficients of the residual blocks are the same for the respective intra prediction modes.

Equation 9 expresses a case in which the quantized transform coefficient for the residual block when the block illustrated in FIG. 17 is predicted with the vertical mode represents the same result as the quantized transform coefficient for the residual block when the block illustrated in FIG. 17 is predicted with the horizontal mode.

$$\text{DCT} \cdot Q(c-\text{ver}) = \text{DCT} \cdot Q(c-\text{hor}) \quad \text{Equation 9}$$

In Equation 9, "c" represents the original pixel block, "ver" and "hor" represents the predicted blocks generated through predicting the corresponding block with the vertical prediction mode and the horizontal prediction mode, respectively, and "DCT·Q(x)" represents a function deriving the quantized transform coefficient of block "x". If Equation 9 is valid, the RD costs according to the two prediction modes are the same, so that a result in a case where any one prediction mode between the vertical prediction mode and the horizontal prediction mode is used in the rate-distortion process is the same as that in a case where the two prediction modes are all used in the rate-distortion process.

Equation 9 may be represented as Equation 10 through simplification using a transform property, such as a rule of the DCT distribution. In Equation 10, values of the both sides are not the same accurately, but similar to each other considering the case of the application of a non-linear quantization.

$$\text{DCT} \cdot Q(c) - \text{DCT} \cdot Q(\text{ver}) \text{DCT} \cdot Q(c) - \text{DCT} \cdot Q(\text{hor})$$
$$\text{DCT} \cdot Q(\text{ver}-\text{hor}) O \quad \text{Equation 10}$$

It can be seen through Equation 10 that when the block illustrated in FIG. 17 is predicted with the two intra prediction modes and the residual blocks of the predicted blocks are transformed and quantized, a difference between the quantized transform coefficients of the residual blocks for the intra prediction modes is similar to "0" matrix.

Since Equation 10 is derived from Equation 9, when Equation 10 is valid, it means that the prediction encoding according to the two intra prediction modes generates the same RD cost. Accordingly, when Equation 10 is valid, the compression performance is not degraded even when any one intra prediction mode between the vertical prediction mode and the horizontal prediction mode is used in the RDO process. When such an approach is defined to the nine intra prediction modes for the intra 4×4 prediction, Equation 11 may be derived.

$$\text{DCT} \cdot Q(p1-p2) \text{DCT} \cdot Q(p1-p3) \text{DCT} \cdot Q(p1-p4) \ldots$$
$$\text{DCT} \cdot Q(p1-p9) \quad \text{Equation 11}$$

In Equation 11, "p1" represents the predicted block predicted with one intra prediction mode among the nine intra prediction modes, and "p2" through "P9" represent the predicted blocks predicted with the remaining intra prediction modes among the nine intra prediction modes.

Accordingly, when the video encoding apparatus 500 predicts a corresponding block with various available intra prediction modes to generate the predicted blocks and thus Equation 11 is valid, since the video encoding apparatus 500 may determine that the pixel values of the adjacent pixels of the corresponding block are almost the same, the video encoding apparatus 500 may determine that the similarity of the pixel values of the adjacent pixels is high, and thus determine the predetermined intra prediction mode as the intra prediction mode of the corresponding block, and may not encode and transmit the mode identifier for the corresponding block.

Similarly, in order to determined an intra prediction mode for a corresponding block, the video decoding apparatus 1300 predicts the corresponding block with various available intra prediction modes to generate predicted blocks, does not fetch mode identifiers stored in the buffer when quantized frequency coefficients generated through the transform and the quantization of the predicted blocks or residual blocks according the predicted blocks are the same for the respective intra prediction modes, and selects the predetermined intra prediction mode as an intra prediction mode of the corresponding block, and fetches mode identifiers stored in the buffer when quantized frequency coefficients generated through the transform and the quantization of the predicted blocks or residual blocks according the predicted blocks are not the same for the respective intra prediction modes, and selects the intra prediction mode indicated by the fetched mode identifier as an intra prediction mode of the corresponding block.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of a video processing of compressing and transmitting a video and decompressing and displaying the video, so it simplifies a process of selecting a prediction mode for the compression of a video to improve a compression speed and decreases a size of compressed data to improve the compression efficiency.

The invention claimed is:

1. An apparatus for encoding a macroblock which is divided into a plurality of blocks, the apparatus comprising:
a prediction mode selector configured to select an intra prediction mode related to a prediction direction with respect to each of the blocks in the macroblock by calculating a similarity between previously encoded pixels adjacent to a block to be encoded in the macroblock and selecting an intra prediction mode of the block to be encoded based on the similarity between the previously encoded pixels, wherein the prediction mode selector is configured to
select, when the similarity between the previously encoded pixels is equal to or higher than a threshold, a predetermined default intra prediction mode as the intra prediction mode of the block to be encoded, and
select, when the similarity between the previously encoded pixels is lower than the threshold, the intra prediction mode of the block to be encoded from among a plurality of intra prediction modes;
an intra prediction encoder configured to encode a residual block generated by intra-predicting each of the blocks according to the selected intra prediction mode corresponding thereto to generate information on transform coefficients; and
a bitstream generator configured to
encode a mode identifier for indicating the intra prediction mode of the block to be encoded among the plurality of intra prediction modes when the intra prediction mode of the block to be encoded is selected from among the plurality of intra prediction modes, wherein the mode identifier of the block to be encoded is not encoded when the predetermined default intra prediction mode is selected as the intra prediction mode of the block to be encoded, and
generate a bitstream including a mode bit field and a coefficient bit field, wherein the mode bit field include encoded mode identifiers for one or more blocks in the macroblock and the coefficient bit field include the information on transform coefficients of all blocks in the macroblock.

2. The apparatus of claim 1, wherein the mode bit field and the coefficient bit field are included in macroblock data.

3. The apparatus of claim 2, wherein the bitstream generator is configured to include, into the bitstream, a mode bit field pointer for identifying at least one of a size or a position of the mode bit field within the macroblock data into the bitstream.

4. The apparatus of claim 3, wherein the mode bit field pointer indicates the size of the mode bit field within the macroblock data when the mode bit field is positioned before the coefficient bit field in the macroblock data.

5. The apparatus of claim 3, wherein the mode bit field pointer indicates a starting position of the mode bit field within the macroblock data when the mode bit field is positioned after the coefficient bit field in the macroblock data.

6. The apparatus of claim 1, wherein the prediction mode selector is configured to
calculate a variation of pixel values of the previously encoded pixels adjacent to the block as the similarity, and
select the predetermined default intra prediction mode as the intra prediction mode of the block when the variation is smaller than the threshold.

7. The apparatus of claim 3, wherein the mode bit field pointer is inserted into one of a macroblock header, a slice header, and the picture header of the bitstream.

8. The apparatus of claim 1, wherein the predetermined default intra prediction mode is an intra prediction mode of predicting an average of the pixel values of the adjacent pixels of the block as a predicted pixel value of pixels of the block.

9. The apparatus of claim 6, wherein the prediction mode selector is configured to select the intra prediction mode of the block from among the plurality of intra prediction modes when the variation is equal to or higher than the threshold.

10. The apparatus of claim 1, wherein the prediction mode selector is configured to
  calculate, as the similarity,
    a difference between quantized transform coefficients of predicted blocks generated by predicting the block in the plurality of intra prediction modes or
    a difference between the quantized transform coefficients of residual blocks for the predicted blocks, and
  select the intra prediction mode of the block based on the calculated difference.

11. A method of encoding a macroblock which is divided into a plurality of blocks, the method comprising:
  selecting an intra prediction mode related to a prediction direction with respect to each of the blocks in the macroblock, by calculating a similarity between previously encoded pixels adjacent to a block to be encoded in the macroblock and selecting an intra prediction mode of the block to be encoded based on the similarity between the previously encoded pixels adjacent to the block to be encoded, wherein the selecting the intra prediction mode of the block to be encoded comprises,
    when the similarity between the previously encoded pixels is equal to or higher than a threshold, selecting a predetermined default intra prediction mode as the intra prediction mode of the block to be encoded, and
    when the similarity between the previously encoded pixels is lower than the threshold, selecting the intra prediction mode of the block to be encoded from among a plurality of intra prediction modes;
  encoding a residual block generated by intra-predicting each of the blocks according to the selected intra prediction mode corresponding thereto to generate information on transform coefficients;
  encoding a mode identifier for indicating the intra prediction mode of the block to be encoded when the intra prediction mode of the block to be encoded is selected from among the plurality of intra prediction mode, wherein the mode identifier of the block to be encoded is not encoded when the predetermined default intra prediction mode is selected as the intra prediction mode of the block to be encoded;
  generating a bitstream including a mode bit field and a coefficient bit field, wherein the mode bit field includes encoded mode identifiers for one or more blocks in the macroblock and the coefficient bit field includes the information on transform coefficients of all blocks in the macroblock.

12. An apparatus for decoding a macroblock which is divided into a plurality of blocks, the apparatus comprising:
  a bitstream extractor for configured to extract
    mode identifiers for one or more blocks in the macroblock from a mode bit field of a bitstream, wherein a mode identifier of a block which has been encoded using a predetermined default intra prediction mode is not included in the mode bit field and thus is not extracted from the mode bit field, and
    information on transform coefficients for all blocks in the macroblock from a coefficient bit field of the bitstream;
  a prediction mode selector configured to select an intra prediction mode related to a prediction direction with respect to each of the blocks in the macroblock, wherein the prediction mode selector is configured to
    calculate a similarity between previously decoded pixels adjacent to a block to be decoded in the macroblock,
    select, when the similarity between the previously decoded pixels is equal to or higher than a threshold, the predetermined default intra prediction mode as the intra prediction mode of the block to be decoded in the macroblock, and
    select, when the similarity between the previously decoded pixels is lower than the threshold, as the intra prediction mode of the block to be decoded in the macroblock, an intra prediction mode indicated by a mode identifier corresponding to the block to be decoded among a plurality of intra prediction modes; and
  an intra prediction decoder configured to
    decode the information on transform coefficients to reconstruct a residual block of the block to be decoded, and
    reconstructing the block to be decoded by using a predicted block generated by predicting the block according to the selected intra prediction mode of the block and the reconstructed residual block.

13. The apparatus of claim 12, wherein the mode bit field and the coefficient bit field are included in macroblock data of the bitstream.

14. The apparatus of claim 13, wherein the bitstream extractor is configured to extract, from the bitstream, a mode bit field pointer for identifying at least one of a size or a position of the mode bit field within the macroblock data.

15. The apparatus of claim 14, wherein the mode bit field pointer indicates the size of the mode bit field within the macroblock data when the mode bit field is positioned before the coefficient bit field in the macroblock data.

16. The apparatus of claim 14, wherein the mode bit field pointer indicates a starting position of the mode bit field within the macroblock data when the mode bit field is positioned after the coefficient bit field in the macroblock data.

17. The apparatus of claim 12, wherein the prediction mode selector is configured to
  calculate a variation of pixel values of previously decoded pixels adjacent to the block as the similarity, and
  select the intra prediction mode indicated by the mode identifier corresponding to the block as the intra prediction mode of the block when the variation is equal to or higher than the threshold.

18. The apparatus of claim 17, wherein the prediction mode selector is configured to select the predetermined default intra prediction mode as the intra prediction mode of the block when the variation is smaller than the threshold.

19. The apparatus of claim 12, wherein the predetermined default intra prediction mode is an intra prediction mode of predicting an average of the pixel values of the adjacent pixels of the block as a predicted pixel value of pixels of the block.

20. A method of decoding a macroblock which is divided into a plurality of blocks, the method comprising:
  extracting mode identifiers for one or more blocks in the macroblock from a mode bit field of a bitstream, wherein a mode identifier of a block which has been encoded using a predetermined default intra prediction mode is not included in the mode bit field and thus is not extracted from the mode bit field;
  extracting information on transform coefficients for all blocks in the macroblock from a coefficient bit field of the bitstream;

selecting an intra prediction mode related to a prediction direction with respect to each of the blocks in a macroblock;

decoding the information on transform coefficients to reconstruct a residual block of the block to be decoded; and reconstructing the block to be decoded by using a predicted block generated by predicting the block according to the selected intra prediction mode of the block and the reconstructed residual block, wherein the selecting the intra prediction mode with respect to each of the blocks in the macroblock comprises, calculating a similarity between previously decoded pixels adjacent to a block to be decoded in the macroblock;

when the similarity between the previously decoded pixels is equal to or higher than a threshold, selecting the predetermined default intra prediction mode as the intra prediction mode of the block to be decoded in the macroblock, and when the similarity between the previously decoded pixels is lower than the threshold, selecting, as the intra prediction mode of the block to be decoded in the macroblock, an intra prediction mode indicated by a mode identifier corresponding to the block to be decoded among a plurality of intra prediction modes.

* * * * *